(12) United States Patent
Van Dyke et al.

(10) Patent No.: US 12,527,760 B2
(45) Date of Patent: Jan. 20, 2026

(54) SYNTHESIS OF PRO-RESOLVING ANALOGS AND COMPOSITIONS THEREFOR

(71) Applicant: Nocendra Inc., West Roxbury, MA (US)

(72) Inventors: Thomas E. Van Dyke, West Roxbury, MA (US); Charles N. Serhan, West Roxbury, MA (US)

(73) Assignee: Nocendra Inc., West Roxbury, MA (US)

( * ) Notice: Subject to any disclaimer, the term of this patent is extended or adjusted under 35 U.S.C. 154(b) by 938 days.

(21) Appl. No.: 17/629,939

(22) PCT Filed: Jul. 23, 2020

(86) PCT No.: PCT/US2020/043243
§ 371 (c)(1),
(2) Date: Jan. 25, 2022

(87) PCT Pub. No.: WO2021/021552
PCT Pub. Date: Feb. 4, 2021

(65) Prior Publication Data
US 2022/0288005 A1    Sep. 15, 2022

Related U.S. Application Data

(60) Provisional application No. 62/878,937, filed on Jul. 26, 2019.

(51) Int. Cl.
*A61K 31/202* (2006.01)
*A61P 1/02* (2006.01)

(52) U.S. Cl.
CPC .............. *A61K 31/202* (2013.01); *A61P 1/02* (2018.01)

(58) Field of Classification Search
CPC ................................ A61K 31/202; A61P 1/02
See application file for complete search history.

(56) References Cited

U.S. PATENT DOCUMENTS 10,322,102 B2 *   6/2019   Petasis ................. A61K 9/0019

FOREIGN PATENT DOCUMENTS

| WO | WO-2014130068 A1 * | 8/2014 | ........... A61K 31/202 |
| WO | WO-2016149582 A1 * | 9/2016 | ........... A61K 31/202 |
| WO | WO-2017205582 A1 * | 11/2017 | ........... A61K 31/202 |

OTHER PUBLICATIONS

Norling et al, Humanized nano pro-resolving medicines mimic inflammation resolution and enhance wound healing, J Immunology, May 15, 2011; 186 (10): 5543-5547 (Year: 2011).*
Van Dyke et al, Proresolving Nanomedicines Activate Bone Regeneration in Periodontitis, Journal of Dental Research, 2015, vol. 94 (I), 148-156 (Year: 2015).*
Lamoureux et al, A Comparison of Several Modern Alkylating Agents, Special Issue Reviews and Accounts ARKIVOC, 2009, (i) 251-264 (Year: 2009).*
Reddy et al, Overview of Rational Drug Design, ACS Symposium Series, American Chemical Society, Washington, DC, 2009) (Year: 2009).*
Norling, Journal of Immunology, May 15, 2011, 186 (10) 5543-5547 (Year: 2011).*
Van Dyke, Journal of Dental Research, 2015, vol. 94 (I), 148-156 (Year: 2015).*
Petasis et al., "Design and synthesis of benzo-lipoxin A4 analogs with enhanced stability and potent anti-Inflammatory properties," Bioorganic & Medicinal Chemistry Letters, 2008, vol. 18, No. 4, pp. 1382-1387.
PubChem CID: 101937878, Create Date: Dec. 18, 2015.
Sun et al., "Anti-inflammatory and pro-resolving properties of benzo-lipoxin A4 analogs," Prostaglandins, Leukotrienes and Essential Fatty Acids, 2009, vol. 81, Nos. 5-6, pp. 357-366.
International Search Report and Written Opinion mailed Oct. 23, 2020 in corresponding International Patent Application No. PCT/US2020/043243 (9 pages).

* cited by examiner

*Primary Examiner* — Andrew D Kosar
*Assistant Examiner* — Phillip Matthew Rzeczycki
(74) *Attorney, Agent, or Firm* — Greenberg Traurig, LLP; Melissa Hunter-Ensor; Scott Goncher

(57) ABSTRACT

This disclosure relates to methods of synthesizing certain lipoxin analogs (e.g., lipoxin mimetics, etc.) and pharmaceutical compositions comprising these pro-resolving compounds. Methods of administering the lipoxin mimetics (e.g., lipoxin A4 mimetics, lipoxin B4 mimetics, etc.) to patients in need thereof are also provided.

10 Claims, 1 Drawing Sheet

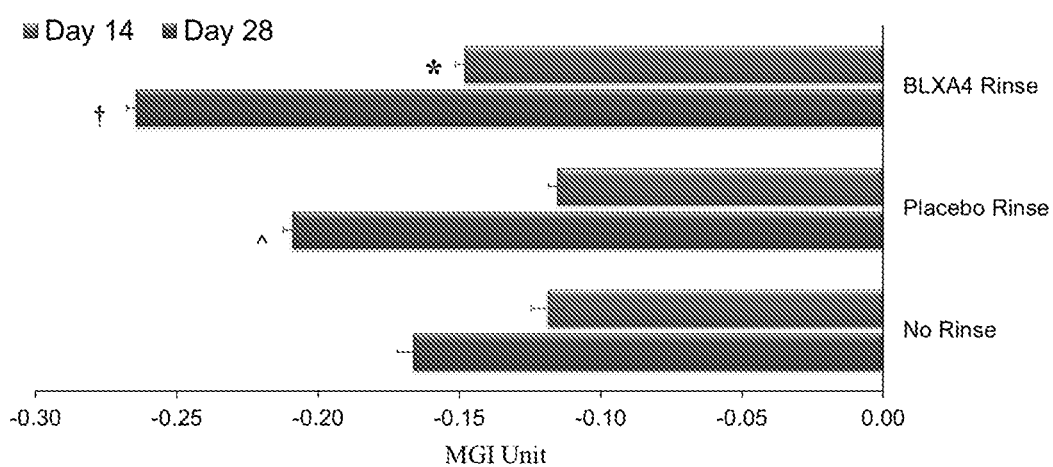

SYNTHESIS OF PRO-RESOLVING ANALOGS AND COMPOSITIONS THEREFOR

CROSS REFERENCE TO RELATED APPLICATIONS

This application is the U.S. National Stage Application, pursuant to 35 U.S.C. § 371 of PCT International Application No. PCT/US2020/043243, filed Jul. 23, 2020 designating the United States and published in English, which claims priority to and the benefit of U.S. App. No. 62/878,937, filed Jul. 26, 2019, the entire contents of each of which are hereby incorporated by reference in their entirety.

BACKGROUND

Oral health disorders, such as gum disease and periodontitis, are widespread among modern human populations. For example, in the U.S. it is estimated that nearly 1 out of 2 American adults—aged 30 and older—have mild to severe periodontitis. The severity of such conditions increases when they are not treated and can lead not only to local oral problems, such as bone and early tooth loss, but also systemic disorders, such as heart disease.

In particular, periodontitis is a local inflammation that occurs as a result of host response against specific microorganisms and eventually leads to the tissue destruction and systemic complications. Once periodontal inflammation is initiated, the cascade of inflammatory events includes an amplified loop until the infection is contained and injury is confined. The early actions of the host response are later replaced by more specific mechanisms and eventually become redundant. Thus, it is important, as in other biologic processes, to limit the response and to allow the inflammation to resolve. While it has been shown that many molecules participate in the initiation and development of the host defense mechanisms, a recent paradigm in periodontal disease pathogenesis emphasizes the importance of counterregulatory molecules in the resolution of inflammatory response to control its magnitude and duration. Specifically, some anti-inflammatory therapeutics utilize inhibitory pathways related to biosynthesis and actions of pro-inflammatory mediators, such as the prostaglandins and leukotrienes. An alternative methodology for therapeutics is based on mimicking the actions the endogenous anti-inflammatory and pro-resolution lipid mediators rather than interfering with the biosynthesis and actions of the pro-inflammatory prostaglandins and leukotrienes.

One such pro-resolution type of active agent are the lipoxins, which feature a trihydroxy-tetraene structure such as lipoxin $A_4$ that carries specific tetraene double bond geometry of E,E,Z,E- and is biosynthesized from arachidonic acid, a polyunsaturated fatty acid present in the phospholipids of membranes of cells. Lipoxins (e.g., Lipoxin $A_4$, Lipoxin $B_4$, etc.) can be biosynthesized via lipoxygenase-mediated transcellular biosynthesis and via single cell types such as macrophages. In general, lipoxins are often rapidly inactivated in vivo via a metabolic enzyme system comprising 15-prostaglandin dehydrogenase and eicosanoid oxido-reductase. There are several isomers of lipoxin including:

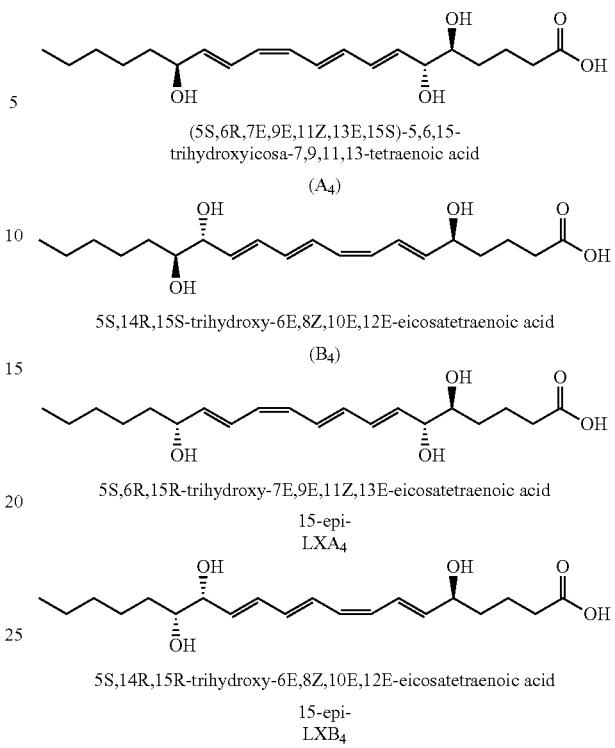

(5S,6R,7E,9E,11Z,13E,15S)-5,6,15-trihydroxyicosa-7,9,11,13-tetraenoic acid ($A_4$)

5S,14R,15S-trihydroxy-6E,8Z,10E,12E-eicosatetraenoic acid ($B_4$)

5S,6R,15R-trihydroxy-7E,9E,11Z,13E-eicosatetraenoic acid 15-epi-$LXA_4$ 5S,14R,15R-trihydroxy-6E,8Z,10E,12E-eicosatetraenoic acid 15-epi-$LXB_4$ Certain lipoxin mimetics have been shown to have increased half-life as compared to lipoxin and mimic the action of naturally occurring lipoxins to potently reduce inflammation upon binding to a G-protein-coupled receptor known to play a key role in modulating inflammation. Structure-function studies of various lipoxin analogs have shown that the most active and longer acting lipoxin analogs have certain structural features. However, the chemical syntheses of these compounds often rely on many synthetic steps that individually and/or collectively may result in low product yields. Furthermore, the developed synthetic schema for these compounds result in various product issues such as impurities. Such problems run counter to good manufacturing practices (GMP) established for such treatment modalities. Furthermore, stabilizing the lipoxin analogs in pharmaceutical compositions has proven costly as well, limiting the utility and cost of goods associated with the lipoxin analogs.

It is therefore an object of the disclosure to provide methods of synthesis of pro-resolving analogs such as lipoxin $A_4$ mimetics which overcome these issues including providing cost efficient synthesis of these compounds. Furthermore, it is an object of the disclosure to provide compositions which are able to stabilize the compounds described herein. Typically, these compositions are suitable for the treatment or prevention of periodontal disease or inflammatory conditions.

SUMMARY

In accordance with the foregoing objectives and others, the present disclosure provides methods of making pro-resolving analogs such as lipoxin analogs (e.g., $A_4$ lipoxin mimetics, etc.), and pharmaceutical compositions comprising such compositions. The pharmaceutical compositions may be used for the treatment or prophylaxis of certain diseases, disorders, or conditions, such as periodontal disease or inflammatory conditions. Furthermore, an aspect of this disclosure includes pharmaceutical compositions with increased stability of the lipoxin analog (e.g., lipoxin mimetic, etc.). Without wishing to be bound by theory, it has been found that lipoxin analogs (and reactants used to produce lipoxin analogs) have increased stability in basic pH environments (e.g., pH>7, pH>7.2, etc.). The pharmaceutical composition may comprise a lipoxin A₄ mimetic or a lipoxin 15-epi-A₄ mimetic. In most embodiments, the lipoxin mimetic comprises a phenyl moiety (e.g., a benzo lipoxin mimetic, etc.). For example, the lipoxin A₄ mimetic may have the structure:

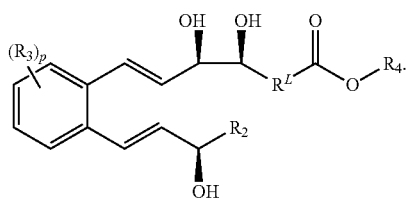

wherein R₁ is selected from hydrogen, saturated or unsaturated C₁-C₇ alkyl optionally substituted one or more times, and C₁-C₇ heteroalkyl optionally substituted one or more times;

R₂ is selected from hydrogen, halogen, hydroxy, cyano, nitro, saturated or unsaturated C₁-C₇ alkyl optionally substituted one or more times, and C₁-C₇ heteroalkyl optionally substituted one or more times;

R₃ is independently selected at each occurrence from hydrogen, hydroxy, halogen, cyano, nitro, saturated or unsaturated C₁-C₇ alkyl optionally substituted one or more times, saturated or unsaturated C₁-C₇ alkoxy optionally substituted one or more times, and C₁-C₇ heteroalkyl optionally substituted one or more times;

R₄ is independently selected from hydrogen, saturated or unsaturated C₁-C₇ alkyl optionally substituted one or more times, and C₁-C₇ heteroalkyl optionally substituted one or more times; and $R^L$ is absent or a C₁-C₇ hydrocarbon (e.g., alkylene, heteroalkylene, lower alkylene such as methylene, ethylene, propylene, etc.) optionally substituted one or more times. In most embodiments, R₄ is not hydrogen. In certain embodiments, the lipoxin A₄ mimetic has the structure:

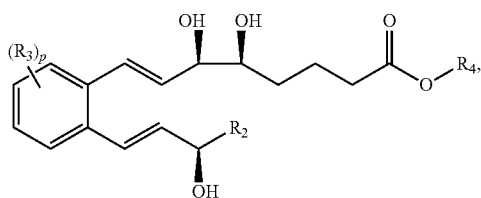

In various implementations, each R₃ may be hydrogen. In certain embodiments, R₂ is methyl, ethyl, propyl, butyl, or pentyl. In some embodiments, R₄ may be methyl. For example, the lipoxin A₄ mimetic may have the structure:

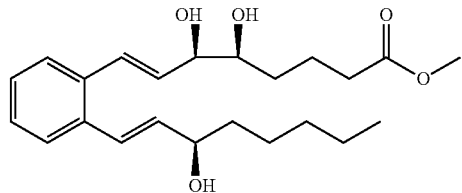

The methods for synthesis of the pro-resolving active analogs (e.g., lipoxin mimetic, etc.) may comprise:
contacting a compound having the structure of Formula (I):

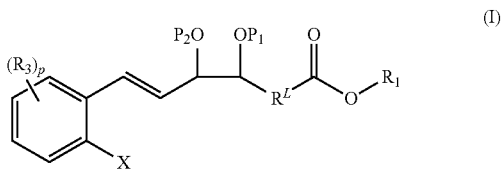

with a compound having the structure of Formula (II):

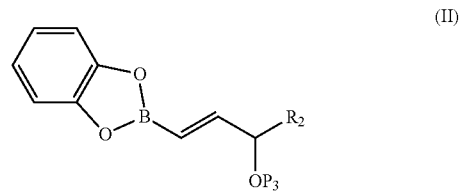

under in an environment suitable to form a compound having the structure of Formula (III):

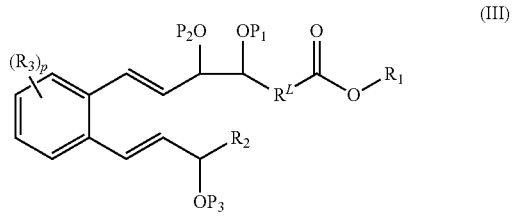

wherein p is an integer from 0-4;

R₁ is selected from hydrogen, saturated or unsaturated C₁-C₇ alkyl optionally substituted one or more times, and C₁-C₇ heteroalkyl optionally substituted one or more times;

R₂ is selected from hydrogen, halogen, hydroxy, cyano, nitro, saturated or unsaturated C₁-C₇ alkyl optionally substituted one or more times, and C₁-C₇ heteroalkyl optionally substituted one or more times;

R₃ is independently selected at each occurrence from hydrogen, hydroxy, halogen, cyano, nitro, saturated or unsaturated C₁-C₇ alkyl optionally substituted one or more times, saturated or unsaturated C₁-C₇ alkoxy optionally substituted one or more times, and C₁-C₇ heteroalkyl optionally substituted one or more times;

$R^L$ is absent or a divalent C₁-C₇ hydrocarbon (e.g., alkylene, heteroalkylene, etc.) optionally substituted one or more times;

P₁-P₃ are each independently an oxygen protecting group (e.g., trityl type protecting group, silyl type protecting group, etc.); and X is a halogen (e.g., bromine, etc.). In certain implementations, the compound of Formula (III) is produced with a molar yield of more than 50% (e.g., more than 60%, more than 70%, etc.) with respect to the compound of Formula (I).

In some embodiments, the method may comprise:
a) deprotecting a compound of Formula (III):

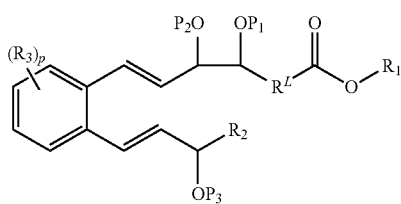

to produce a compound having the structure of Formula (IV):

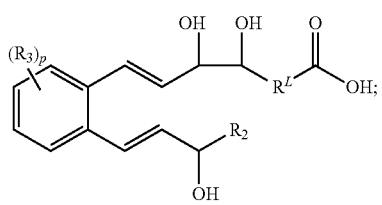

and
b) contacting the compound having the structure of Formula (IV) with an alkylating agent (e.g., alkyl halide, heteroalkyl halide, etc.) to form a compound having the structure of Formula (V):

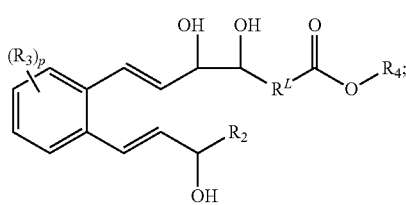

wherein p is an integer from 0-4;
$R_1$ is selected from hydrogen, saturated or unsaturated $C_1$-$C_7$ alkyl optionally substituted one or more times, and $C_1$-$C_7$ heteroalkyl optionally substituted one or more times;
$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;
$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;
wherein $R_4$ is selected from hydrogen, saturated or unsaturated $C_1$-$C_7$ alkyl optionally substituted one or more times, and $C_1$-$C_7$ heteroalkyl optionally substituted one or more times;

$R^L$ is absent or a divalent $C_1$-$C_7$ hydrocarbon (e.g., alkylene, heteroalkylene, etc.) optionally substituted one or more times;
P₁-P₃ are each independently a protecting group (e.g., trityl protecting group, silyl protecting group, etc.).

In some embodiments, the method may comprise:
a) deprotecting a compound of Formula (III):

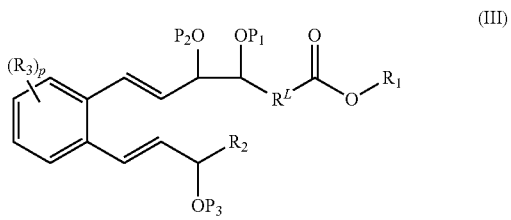

to produce a compound having the structure of Formula (IV):

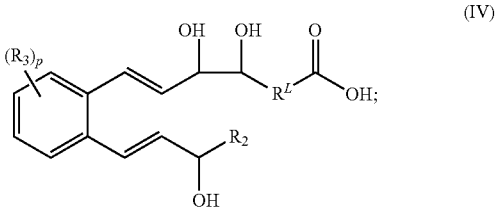

and
b) contacting the compound having the structure of Formula (IV) with an alkylating agent (e.g., alkyl halide, heteroalkyl halide, etc.) to form a compound having the structure of Formula (V):

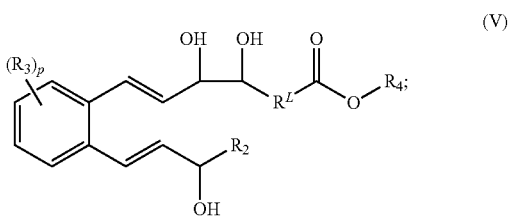

wherein p is an integer from 0-4;
$R_1$ is selected from hydrogen, saturated or unsaturated $C_1$-$C_7$ alkyl optionally substituted one or more times, and $C_1$-$C_7$ heteroalkyl optionally substituted one or more times;
$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;
$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;
wherein $R_4$ is selected from hydrogen, saturated or unsaturated $C_1$-$C_7$ alkyl optionally substituted one or more times, and $C_1$-$C_7$ heteroalkyl optionally substituted one or more times;

$R^L$ is absent or a divalent $C_1$-$C_7$ hydrocarbon (e.g., alkylene, heteroalkylene, etc.) optionally substituted one or more times;

$P_1$-$P_3$ are each independently a protecting group (e.g., trityl protecting group, silyl protecting group, etc.).

In some embodiments, the synthesis of the pro-resolving active analogs (e.g., B4 lipoxin mimetic, etc.) may comprise:

contacting a compound having the structure of Formula (VI):

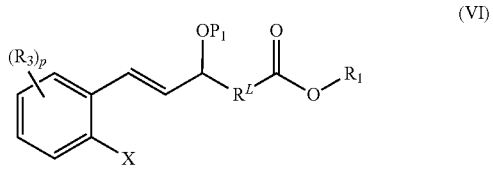

(VI)

with a compound having the structure of Formula (VII):

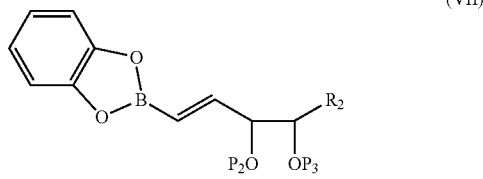

(VII)

under in an environment suitable to form a compound having the structure of Formula (VIII):

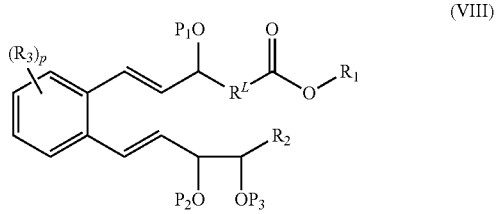

(VIII)

wherein p is an integer from 0-4;
$R_1$ is selected from hydrogen, saturated or unsaturated $C_1$-$C_7$ alkyl optionally substituted one or more times, and $C_1$-$C_7$ heteroalkyl optionally substituted one or more times;
$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;
$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;
$R^L$ is absent or a divalent $C_1$-$C_7$ hydrocarbon (e.g., alkylene, heteroalkylene, etc.) optionally substituted one or more times;
$P_1$-$P_3$ are each independently an oxygen protecting group (e.g., trityl type protecting group, silyl type protecting group, etc.); and
X is a halogen (e.g., bromine, etc.). In certain implementations, the compound of Formula (VIII) is produced with a molar yield of more than 50% (e.g., more than 60%, more than 70%, etc.) with respect to the compound of Formula (VI).

In some embodiments, the method may comprise:
a) deprotecting a compound of Formula (VIII):

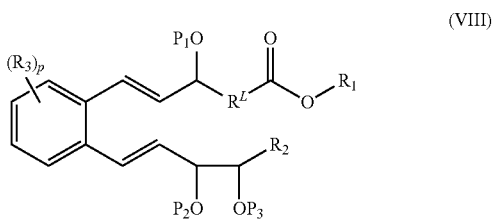

(VIII)

to produce a compound having the structure of Formula (IX):

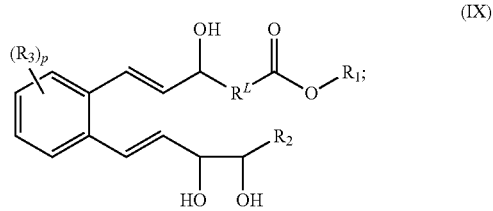

(IX)

and
b) contacting the compound having the structure of Formula (IX) with an alkylating agent (e.g., alkyl halide, heteroalkyl halide, etc.) to form a compound having the structure of Formula (X):

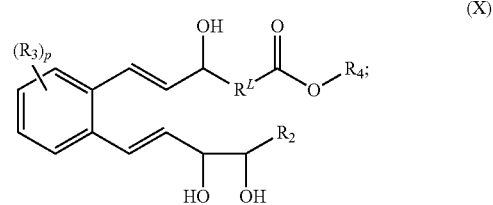

(X)

wherein p is an integer from 0-4;
$R_1$ is selected from hydrogen, saturated or unsaturated $C_1$-$C_7$ alkyl optionally substituted one or more times, and $C_1$-$C_7$ heteroalkyl optionally substituted one or more times;
$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;
$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;
wherein $R_4$ is selected from hydrogen, saturated or unsaturated $C_1$-$C_7$ alkyl optionally substituted one or more times, and $C_1$-$C_7$ heteroalkyl optionally substituted one or more times;
$R^L$ is absent or a divalent $C_1$-$C_7$ hydrocarbon (e.g., alkylene, heteroalkylene, etc.) optionally substituted one or more times;

$P_1$-$P_3$ are each independently a protecting group (e.g., trityl protecting group, silyl protecting group, etc.).

Reaction intermediates are also provided. In most embodiments, the reaction intermediate is a compound having the structure of formula (I)-(IV) or a compound having the structure of formula (VI)-(IX).

The lipoxin analog (e.g., lipoxin mimetic, etc.) such as the compounds having the structure of formula (IV) or the structure of formula (V) or the structure of formula (IX) or the structure of formula (X) may be formulated into pharmaceutical compositions. It will be understood that the lipoxin analogs (e.g., lipoxin mimetics such as (5S,6R,E)-5,6-dihydroxy-8-(2-((R,E)-3-hydroxyoct-1-en-1-yl)phenyl)oct-7-enoic acid, etc.) formulated in these pharmaceutical compositions may be synthesized by the methods described herein or by other methods known in the art. Without wishing to be bound by theory, compositions with acidic pH promote the degradation of various lipoxin analogs In certain embodiments, the pharmaceutical composition has a pH greater than 7. For example, the pharmaceutical composition may comprise one or more pharmaceutically acceptable carriers, excipients, and/or diluents and a compound having the structure of Formula (V) or (X):

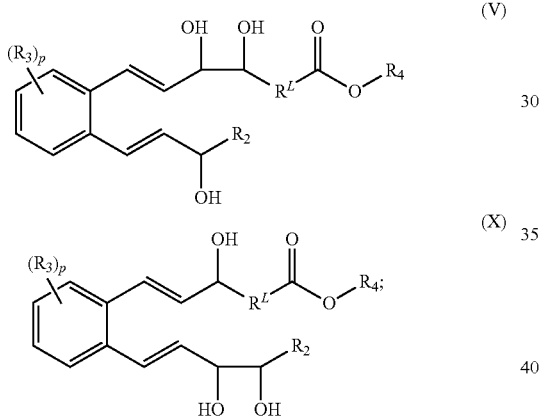

or carboxylate salts thereof;
wherein p is an integer from 0-4;
$R_1$ is selected from hydrogen, saturated or unsaturated $C_1$-$C_7$ alkyl optionally substituted one or more times, and $C_1$-$C_7$ heteroalkyl optionally substituted one or more times;
$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;
$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;
$R^L$ is absent or a divalent $C_1$-$C_7$ hydrocarbon (e.g., alkylene, heteroalkylene, etc.) optionally substituted one or more times; and
the pH of said composition is greater than 7 (e.g., greater than 7.1, greater than 7.2, from 7-12, from 7-10, from 7.1-10 from 7.2-10, etc.). Without wishing to be bound by theory, it is believed that pH's above 7 result in decreased degradation of the ester form of these compounds. Accordingly, in certain embodiments, the compositions comprise no carboxylate salt or less than 5% carboxylate salt (e.g., less than 1% carboxylate salt, less than 0.1% carboxylate salt, less than 0.01%, etc.) by weight of the composition. In some embodiments, the composition comprises less than 5% of said carboxylate salt or hydrolyzed form of said compound (e.g. free acid form wherein $R_4$ is hydrogen, etc.) by weight of the composition after more than three days of room temperature conditions (40°+2° C./70%±5% RH) and/or accelerated aging conditions (40° C./75% RH). In certain implementations, the composition comprises less than 5% of said carboxylate salt or hydrolyzed form of said compound (e.g. free acid form wherein $R_4$ is hydrogen, etc.) by weight of the composition after more than one month of long term storage conditions (e.g., −20°±4° C.). In various implementations, the composition comprises less than 5% carboxylate salt (e.g., less than 1% carboxylate salt, less than 0.1% carboxylate salt, less than 0.01%, etc.) by weight of the composition following 7 days of storage at 25° C./60% RH or 40° C./75% RH. In certain implementations, the composition comprises less than 5% carboxylate salt (e.g., less than 1% carboxylate salt, less than 0.1% carboxylate salt, less than 0.01%, etc.) by weight of the composition following 7 days of storage following 3 months, or six months or twelve months, or 18 months, or 24 months or 36 months or 48 months or 60 months of storage at −20° C. To achieved, these stabilities, the pH of the composition may be from, example, 7-8 or from 7-7.5 or from 7.2-8 or from 7.1-7.4. These compositions may be formulated as an oral care composition, for example, as a mouth rinse, tooth paste, ointment, gel, hydrogel, salve, dentifrice, buccal patch, dental fiber, dental tape, chewing gum, food additive, lozenge, tablet, or chewable capsule. In certain embodiments, the compositions may be formulated for topical delivery of the lipoxin mimetic to the skin or delivery of the lipoxin mimetic to the eye. In some implementations, the composition may be a cream, ointment, or a controlled-release patch or spray applied to the skin. In certain embodiments, the compound may have the structure of formula (Va) or (Xa):

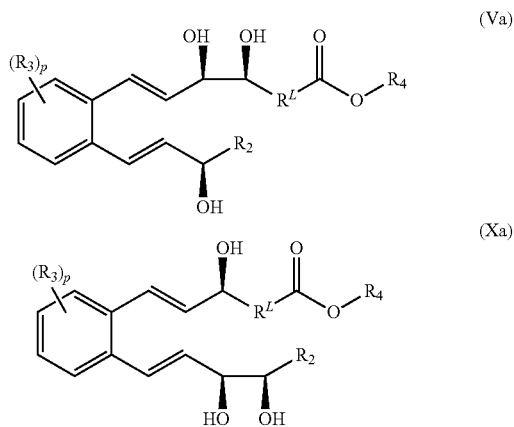

Methods for the treatment or prophylaxis of a disorder, disease, or condition using these pharmaceutical compositions are also provided. In certain embodiments, the compositions may be used for the treatment or the prophylaxis of a disorder such as an oral disorder, a skin disorder, or an eye disorder. In certain implementations, the methods may comprise administration of the pharmaceutical compositions disclosed herein to a patient in need thereof. For example, the pharmaceutical compositions may be administered daily, twice daily, every other day, or weekly.

BRIEF DESCRIPTION OF THE FIGURE

FIG. 1 is a schematic illustrating the change in gingival index of clinical groups as measured by Marginal Gingival Index (MGI) for treatment groups administered Compound (Vb) (BLXA4), a placebo rinse, and no rinse measured at Days 14 and 28 of administration. In each group, Day 14 is the topmost column, and Day 28 is the bottommost column.

DETAILED DESCRIPTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

All terms used herein are intended to have their ordinary meaning in the art unless otherwise provided. All concentrations are in terms of percentage by weight of the specified component relative to the entire weight of the topical composition, unless otherwise defined.

As used herein, "a" or "an" shall mean one or more. As used herein when used in conjunction with the word "comprising," the words "a" or "an" mean one or more than one. As used herein "another" means at least a second or more.

As used herein, all ranges of numeric values include the endpoints and all possible values disclosed between the disclosed values. The exact values of all half integral numeric values are also contemplated as specifically disclosed and as limits for all subsets of the disclosed range. For example, a range of from 0.1% to 3% specifically discloses a percentage of 0.1%, 1%, 1.5%, 2.0%, 2.5%, and 3%. Additionally, a range of 0.1 to 3% includes subsets of the original range including from 0.5% to 2.5%, from 1% to 3%, from 0.1% to 2.5%, etc. It will be understood that the sum of all weight % of individual components will not exceed 100%. As used herein, "% by weight" or "% wt." or "w/w" refers to the weight percent of a component in relation to the total weight of the composition unless otherwise stated. Every reference to percentage or % herein is given on a % by weight basis, unless stated otherwise. It will be understood that the sum of all weight % of individual components within a composition or within indicated component will not exceed 100%.

By "consist essentially" it is meant that the ingredients include only the listed components along with the normal impurities present in commercial materials and with any other additives present at levels which do not affect the operation of the invention, for instance at levels less than 5% by weight or less than 1% or even 0.5% by weight.

A "patient in need thereof," as used herein, refers to a human individual, male or female, who would benefit from administration of therapeutically effective doses of the lipid compositions. As described herein, in some embodiments, an individual in need thereof is suffering from a disorder such as periodontal disease. A patient in need or an individual in need or subject in need are used interchangeably herein.

As used herein, the phrase "pharmaceutically acceptable" generally safe for ingestion or contact with biologic tissues at the levels employed. Pharmaceutically acceptable is used interchangeably with physiologically compatible. It will be understood that the pharmaceutical compositions of the invention include topical care compositions including topical oral care compositions (e.g., mouthwash, etc.) and topical skin care compositions.

As used herein, "pharmaceutically acceptable carrier" includes any and all solvents, dispersion media, coatings, antibacterial and antifungal agents, isotonic and absorption delaying agents and the like. The pharmaceutically acceptable carrier or excipient does not destroy the pharmacological activity of the disclosed compound and is nontoxic when administered in doses sufficient to deliver a therapeutic amount of the compound. The use of such media and agents for pharmaceutically active substances is well known in the art. Except insofar as any conventional media or agent is incompatible with the active ingredient, its use in the therapeutic compositions as disclosed herein is contemplated. Non-limiting examples of pharmaceutically acceptable carriers and excipients include sugars such as lactose, glucose and sucrose; starches such as corn starch and potato starch; cellulose and its analogs such as sodium carboxymethyl cellulose, ethyl cellulose and cellulose acetate; powdered tragacanth; malt; gelatin; talc; cocoa butter and suppository waxes; oils such as peanut oil, cottonseed oil, safflower oil, sesame oil, olive oil, corn oil and soybean oil; glycols, such as polyethylene glycol and propylene glycol; esters such as ethyl oleate and ethyl laurate; agar; buffering agents such as magnesium hydroxide and aluminum hydroxide; alginic acid; isotonic saline; Ringer's solution; ethyl alcohol; phosphate buffer solutions; non-toxic compatible lubricants such as sodium lauryl sulfate and magnesium stearate; coloring agents; releasing agents; coating agents; sweetening, flavoring and perfuming agents; preservatives; antioxidants; ion exchangers; alumina; aluminum stearate; lecithin; self-emulsifying drug delivery systems (SEDDS) such as d-atocopherol polyethyleneglycol 1000 succinate; surfactants used in pharmaceutical dosage forms such as Tweens or other similar polymeric delivery matrices; serum proteins such as human serum albumin; glycine; sorbic acid; potassium sorbate; partial glyceride mixtures of saturated vegetable fatty acids; water, salts or electrolytes such as protamine sulfate, disodium hydrogen phosphate, potassium hydrogen phosphate, sodium chloride, and zinc salts; colloidal silica; magnesium trisilicate; polyvinyl pyrrolidone; cellulose-based substances; polyacrylates; waxes; and polyethylene-polyoxypropylene-block polymers.

The phrase "therapeutically effective amount" or "pharmaceutically effective amount" as used herein, means an amount necessary to provide the indicated therapeutic benefit (e.g., the treatment or prophylaxis of a disease (e.g., gum disease, periodontitis), anti-inflammatory benefit, etc.). As used herein, an "effective amount" is the amount required to confer a therapeutic effect on the treated patient. Typically, the effective amount is determined based on physical parameters such as age, surface area, weight, height, and condition of the patient. For example, a therapeutically effective amount may be from 0.01 mg to 10 g administered once (q.d.) or twice (b.i.d.) daily. In certain embodiments, the therapeutically effective amount may be administered less than once daily (e.g., every other day, weekly, etc.). In one embodiment, an effective amount is an amount that reduces inflammation associated with gum disease or periodontitis.

It will be understood that the description of compounds herein is limited by principles of chemical bonding known to those skilled in the art. Accordingly, where a group may be substituted by one or more of a number of substituents, such substitutions are selected so as to comply with principles of chemical bonding with regard to valences, etc., and to give compounds which are not inherently unstable. For example, any carbon atom will be bonded to two, three, or four other atoms, consistent with the four valence electrons of carbon.

As used herein, the term "pharmaceutically acceptable salt" refers to a salt of active agents (e.g., compounds having the structure of Formula (V), etc.) contemplated within the disclosure, including inorganic acids, organic acids, inorganic bases, organic bases, solvates, hydrates, or clathrates thereof. The pharmaceutically acceptable salt may be a carboxylate salt of compounds having the structure of Formula (V). The term salt embraces addition salts of free acids or free bases that are compounds described herein. Typically, an acid addition salt may be salt of a compound of the invention prepared by reaction of a compound of the invention with a mineral or organic acid. For exemplification of pharmaceutically acceptable acid addition salts, see, e.g., Berge, S. M., Bighley, L. D., and Monkhouse, D. C., *J. Pharm. Sci.*, 66:1, 1977, which is hereby incorporated by reference in its entirety. Any of the lipoxin analogs of the present disclosure (e.g., compounds having the structure of Formula (V), etc.) may be in the form of pharmaceutically acceptable salts (e.g., carboxylate salts thereof, etc.). Typically, these salts that are physiologically compatible, as defined herein, and that possess the desired pharmacological activity of the parent compound. Such salts include: acid addition salts formed with inorganic acids such as hydrochloric acid, hydrobromic acid, sulfuric acid, nitric acid, phosphoric acid, and the like; or formed with organic acids such as acetic acid, benzenesulfonic acid, benzoic acid, camphorsulfonic acid, citric acid, ethanesulfonic acid, fumaric acid, glucoheptonic acid, gluconic acid, glutamic acid, glycolic acid, hydroxynaphtoic acid, 2-hydroxyethanesulfonic acid, lactic acid, maleic acid, malic acid, malonic acid, mandelic acid, methane sulfonic acid, muconic acid, 2-naphthalenesulfonic acid, propionic acid, salicylic acid, succinic acid, tartaric acid, p-toluenesulfonic acid, trimethylacetic acid, and the like; or salts formed when an acidic proton present in the parent compound either is replaced by a metal ion, e.g., an alkali metal ion, an alkaline earth ion, or an aluminum ion; or coordinates with an organic or inorganic base. Acceptable organic bases include diethanolamine, ethanolamine, N-methylglucamine, triethanolamine, tromethamine, and the like. Acceptable inorganic bases include aluminum hydroxide, calcium hydroxide, potassium hydroxide, sodium carbonate, and sodium hydroxide.

Pharmaceutically acceptable acid addition salts of the invention can be formed by the reaction of a compound of the invention with an equimolar or excess amount of acid. Alternatively, hemi-salts can be formed by the reaction of a compound of the invention with the desired acid in a 2:1 ratio, compound to acid. The reactants are generally combined in a mutual solvent such as diethyl ether, tetrahydrofuran, methanol, ethanol, iso-propanol, benzene, or the like. The salts normally precipitate out of solution within, e.g., one hour to ten days and can be isolated by filtration or other conventional methods.

Prodrugs are intended to include any covalently bonded carriers that release an active parent drug (compound) of the present invention in vivo when such prodrug is administered to a subject. Prodrugs are prepared, for example, by modifying functional groups present in the compound in such a way that the modifications are cleaved, either in routine manipulation or in vivo, to the parent compound. In certain cases, a prodrug has improved physical and/or delivery properties over the parent compound. Prodrugs increase the bioavailability of the active compound when administered to a subject (e.g., by permitting enhanced absorption into the blood following oral administration) or which enhance delivery to a biological compartment of interest (e.g., the brain or lymphatic system) relative to the parent compound. Exemplary prodrugs include analogs of a disclosed compound with enhanced aqueous solubility or active transport through the gut membrane, relative to the parent compound.

Unless otherwise stated, structures depicted herein are also meant to include all isomeric (e.g., enantiomeric, diastereomeric, and geometric (or conformational), etc.) forms of the depicted structure. Therefore, single stereochemical isomers as well as enantiomeric, diastereomeric, and geometric (or conformational) mixtures of the presently disclosed compounds (e.g., diacylated sphingomyelin analogs, phosphatidylcholines, sphingomyelins, etc.) are within the scope of the invention. Unless otherwise stated, all tautomeric forms of the compounds may be used as well.

When the stereochemistry of a disclosed compound is named or depicted by structure, the named or depicted stereoisomer may be present as a mixture of stereoisomers comprising more than 50% (e.g., at least 60%, 70%, 80%, 90%, 99%, or 99.9%) by weight of the indicated stereoisomer relative to the other stereoisomers. When a single enantiomer is named or depicted by structure, the depicted or named enantiomer may be more than 50% (e.g., at least 60%, 70%, 80%, 90%, 99%, or 99.9%) by weight optically pure. When a single diastereomer is named or depicted by structure, the depicted or named diastereomer may be more than 50% (e.g., at least 60%, 70%, 80%, 90%, 99%, or 99.9%) by weight pure. Percent optical purity is the ratio of the weight of the enantiomer or over the weight of the enantiomer plus the weight of its optical isomer. Diastereomeric purity by weight is the ratio of the weight of one diastereomer or over the weight of all the diastereomers. When the stereochemistry of a disclosed compound is named or depicted by structure, the named or depicted stereoisomer may be more than 50% (e.g., at least 60%, 70%, 80%, 90%, 99%, or 99.9%) by mole fraction pure relative to the other stereoisomers. When a single enantiomer is named or depicted by structure, the depicted or named enantiomer may be more than 50% (e.g., at least 60%, 70%, 80%, 90%, 99%, or 99.9%) by mole fraction pure. When a single diastereomer is named or depicted by structure, the depicted or named diastereomer may be more than 50% (e.g., at least 60%, 70%, 80%, 90%, 99%, or 99.9%) by mole fraction pure. Percent purity by mole fraction is the ratio of the moles of the enantiomer or over the moles of the enantiomer plus the moles of its optical isomer. Similarly, percent purity by moles fraction is the ratio of the moles of the diastereomer or over the moles of the diastereomer plus the moles of its isomer.

The hydrocarbon groups referenced herein typically refer to a radical (e.g., monovalent, divalent, etc.) or group containing carbon and hydrogen atoms. Examples of hydrocarbon radicals include, without limitation, alkyl, alkenyl, alkynyl, aryl, aryl-alkyl, alkyl-aryl, and any combination thereof (e.g., alkyl-aryl-alkyl, etc.). As used herein, unless otherwise indicated, hydrocarbons may be monovalent or multivalent (e.g., divalent, trivalent, etc.) hydrocarbon radicals. A radical of the form —$(CH_2)_n$— (i.e., those with repeat methylene units), including a methylene radical, i.e., —$CH_2$—, is regarded as an alkyl radical if it does not have unsaturated bonds between carbon atoms. Unless otherwise specified, all hydrocarbon radicals (including substituted and unsubstituted alkyl, alkenyl, alkynyl, aryl, aryl-alkyl, alkyl-aryl, etc.) may have from 1-35 carbon atoms. In other embodiments, hydrocarbons will have from 1-20 or from 1-12 or from 1-8 or from 1-7 or from 1-6 or from 1-3 carbon atoms, including for example, embodiments having one, two, three, four, five, six, seven, eight, nine, or ten carbon atoms. Hydrocarbons may have from 2 to 70 atoms or from 3 to 40 atoms or from 4 to 20 atoms.

Hydrocarbons may be substituted or unsubstituted. Substituted hydrocarbons may have as a substituent one or more unsubstituted hydrocarbon radicals, substituted hydrocarbon radicals, may comprise one or more heteroatoms (e.g., heteroalkyl, etc.), or combinations thereof. Any hydrocarbon substituents disclosed herein may optionally include from 1-20 (e.g., 1-10, 1-5, etc.) heteroatoms. Examples of substituted hydrocarbon radicals include, without limitation, heterocycles, such as heteroaryls. Unless otherwise specified, a hydrocarbon substituted with one or more heteroatoms will comprise from 1-20 heteroatoms (e.g., N, O, S, P, F, Cl, Br, etc.). In other embodiments, a hydrocarbon substituted with one or more heteroatoms will comprise from 1-12 or from 1-8 or from 1-6 or from 1-4 or from 1-3 or from 1-2 heteroatoms. Examples of heteroatoms include, but are not limited to, oxygen, nitrogen, sulfur, phosphorous, halogen (F, Cl, Br, I, etc.), boron, silicon, etc. In some embodiments, heteroatoms will be selected from the group consisting of oxygen, nitrogen, sulfur, phosphorous, and halogen (e.g., F, Cl, Br, I, etc.). In certain implementations, the heteroatoms may be selected from O, N, or S. In some embodiments, a heteroatom or group may substitute a hydrogen. In some embodiments, a substituted hydrocarbon may comprise one or more heteroatoms in the backbone or chain of the molecule (e.g., interposed between two carbon atoms, as in "oxa"). In some embodiments, a substituted hydrocarbon may comprise one or more heteroatoms pendant from the backbone or chain of the molecule (e.g., covalently bound to a carbon atom in the chain or backbone, as in "oxo").

Where a hydrocarbon, such as an alkyl or heteroaryl group, is substituted with a specified group such as an unsubstituted $C_1$-$C_{20}$ alkyl, or unsubstituted 2 to 20 membered heteroalkyl, the hydrocarbon may contain one or more unsubstituted $C_1$-$C_{20}$ alkyls, and/or one or more unsubstituted 2 to 20 membered heteroalkyls. Substituents typically refer to a group substituted on, for example, an alkyl, haloalkyl, cycloalkyl, heterocyclyl, heterocycloalkenyl, cycloalkenyl, aryl, or heteroaryl group at any atom of that group, replacing one or more hydrogen atoms therein. In one aspect, the substituent(s) on a group are independently any one single, or any combination of two or more of the permissible atoms or groups of atoms delineated for that substituent. In another aspect, a substituent may itself be substituted with any one of the above substituents. Further, optionally substituted indicates that specified hydrocarbon may be unsubstituted (e.g., substituted with an H, etc.) or substituted. It is understood that substitution at a given atom is limited by valency. Common substituents include halo (e.g., F, etc.), $C_{1-12}$ straight chain or branched chain alkyl, $C_{2-12}$ alkenyl, $C_{2-12}$ alkynyl, $C_{3-12}$ cycloalkyl, $C_{6-12}$ aryl, $C_{3-12}$ heteroaryl, $C_{3-12}$ heterocyclyl, $C_{1-12}$ alkylsulfonyl, nitro, cyano, —COOR, —C(O)NRR', —OR, —SR, —NRR', and oxo, such as mono- or di- or tri-substitutions with moieties such as trifluoromethoxy, chlorine, bromine, fluorine, methyl, methoxy, pyridyl, furyl, triazyl, piperazinyl, pyrazoyl, imidazoyl, and the like, each optionally containing one or more heteroatoms such as halo, N, O, S, and P. In certain embodiments, R, R', and R" may be independently at each occurrence hydrogen, $C_{1-12}$ alkyl, $C_{1-12}$ haloalkyl, $C_{2-12}$ alkenyl, $C_{2-12}$ alkynyl, $C_{3-12}$ cycloalkyl, $C_{4-24}$ cycloalkylalkyl, $C_{6-12}$ aryl, $C_{7-24}$ aralkyl, $C_{3-12}$ heterocyclyl, $C_{3-24}$ heterocyclylalkyl, $C_{3-12}$ heteroaryl, or $C_{4-24}$ heteroarylalkyl. Unless otherwise noted, all groups described herein optionally contain one or more common substituents, to the extent permitted by valency. Typically, the use of a substituent (radical) prefix names such as alkyl without the modifier "optionally substituted" or "substituted" is understood to mean that the particular substituent is unsubstituted. However, the use of "haloalkyl" without the modifier "optionally substituted" or "substituted" is still understood to mean an alkyl group, in which at least one hydrogen atom is replaced by halo.

The alkyl groups referenced herein may refer to a saturated hydrocarbon chain that may be a straight chain or branched chain, containing the indicated number of carbon atoms. For example, $C_1$-$C_7$ alkyl indicates that the group may have from 1 to 7 (inclusive) carbon atoms in it. Any atom can be optionally substituted, e.g., by one or more substituents. Examples of alkyl groups include without limitation methyl, ethyl, n-propyl, isopropyl, and tert-butyl. Any alkyl group referenced herein (e.g., R, R', R", $R_1$, $R_2$, $R_3$, $R_4$, $R_5$, etc.) may have from 1-35 carbon atoms. In other embodiments, alkyl groups will have from 1-20 or from 1-12 or from 1-8 or from 1-6 or from 1-3 carbon atoms, including for example, embodiments having one, two, three, four, five, six, seven, eight, nine, or ten carbon atoms.

An unsaturated alkyl group may have one or more double bonds. For example, unsaturated alkyl includes alkenyl. Any alkenyl group may be a straight or branched hydrocarbon chain containing the indicated number of carbon atoms and having one or more carbon-carbon double bonds. Any atom can be optionally substituted, e.g., by one or more substituents. Alkenyl groups can include, e.g., vinyl, allyl, 1-butenyl, and 2-hexenyl. One of the double bond carbons can optionally be the point of attachment of the alkenyl substituent. Any alkenyl group referenced herein (e.g., R, R', R", $R_1$, $R_2$, $R_3$, $R_4$, $R_5$, etc.) may have from 1-35 carbon atoms. In other embodiments, alkenyl groups will have from 1-20 or from 1-12 or from 1-8 or from 1-6 or from 1-3 carbon atoms, including for example, embodiments having one, two, three, four, five, six, seven, eight, nine, or ten carbon atoms.

Heteroalkyl groups typically have one or more carbon atoms substituted with one or more heteroatoms (e.g., N, O, P, S, Si, etc.). Heteroalkyls include alkoxy and thioalkoxy. For example, alkoxy is an example of a heteroalkyl group with a carbon substituted with an oxygen (i.e., alkoxy may be represented by the formula —O(alkyl), etc. Alkoxy can be, for example, methoxy (—OCH$_3$), ethoxy, propoxy, isopropoxy, butoxy, iso-butoxy, sec-butoxy, pentoxy, 2-pentoxy, 3-pentoxy, or hexyloxy. Thioalkoxy groups may be represented by formula —S(alkyl), and haloalkoxy and halothioalkoxy refer to —O(haloalkyl) and —S(haloalkyl), respectively. Any alkoxy, thioalkoxy, or haloalkoxy group referenced herein (e.g., R, R', R", $R_1$, $R_2$, $R_3$, $R_4$, $R_5$, etc.) may have from 1-35 carbon atoms. In other embodiments, alkoxy, thioalkoxy, or haloalkoxy groups will have from 1-20 or from 1-12 or from 1-8 or from 1-6 or from 1-3 carbon atoms, including for example, embodiments having one, two, three, four, five, six, seven, eight, nine, or ten carbon atoms.

The methods for synthesis of the lipoxin analogs may comprise:

contacting a compound having the structure of Formula (I):

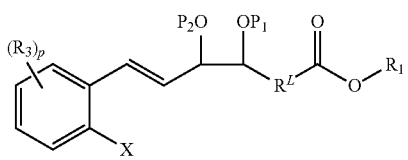

(I)

with a compound having the structure of Formula (II):

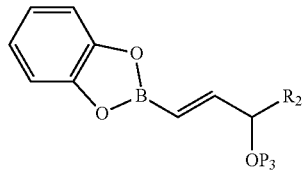

(II)

under in an environment suitable to form a compound having the structure of Formula (III):

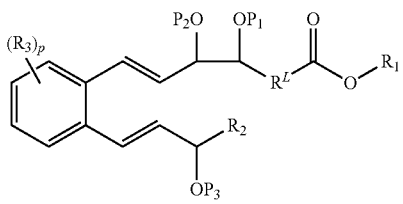

(III)

wherein p is an integer from 0-4;
$R_1$ is selected from hydrogen, saturated or unsaturated $C_1$-$C_7$ alkyl optionally substituted one or more times, and $C_1$-$C_7$ heteroalkyl optionally substituted one or more times;
$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;
$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;
$R^L$ is absent or a divalent $C_1$-$C_7$ hydrocarbon (e.g., alkylene, heteroalkylene, etc.) optionally substituted one or more times;
$P_1$-$P_3$ are each independently an oxygen protecting group (e.g., trityl type protecting group, silyl type protecting group, etc.); and
X is a halogen (e.g., bromine, etc.). In certain implementations, the compound of Formula (III) is produced with a molar yield of more than 50% (e.g., more than 60%, more than 70%, etc.) with respect to the compound of Formula (I). In certain implementations, the compound of Formula (III) has the structure:

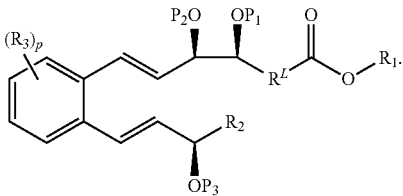

In certain embodiments, the environment suitable to form a compound having the structure of Formula (III) is an aqueous environment. The reaction mixture may comprise a base (e.g., $K_2CO_3$, etc.), a palladium catalyst (e.g., $Pd(PPh_3)_4$, etc.), and combinations thereof. In various implementations, the reaction parameters (including starting materials, reaction medium, etc.) may be set such that $R_1$ is $C_1$-$C_7$ alkyl (e.g., methyl, ethyl, propyl, isopropyl, butyl, isobutyl, pentyl, etc.). In some embodiments, m and n are each 1. In particular implementations, p is 0. The linking moiety $R^L$ may be $C_1$-$C_7$ alkylene (e.g., linear alkylene, branched alkylene, —$(CH_2)_{1-5}$—, —$(CH_2)_{2-4}$—, —$(CH_2)_3$—, etc.). In certain embodiments, $R_2$ may be $C_1$-$C_7$ alkyl (e.g., methyl, ethyl, propyl, isopropyl, butyl, isobutyl, pentyl, etc.). For example, the compound of Formula (III) may be methyl (5S,6R,E)-5,6-bis((tert-butyldimethylsilyl)oxy)-8-(2-((R,E)-3-((tert-butyldimethylsilyl)oxy)oct-1-en-1-yl)phenyl)oct-7-enoate having the structure:

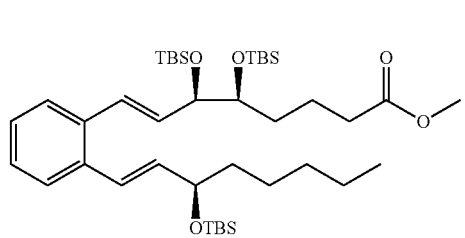

(IIIa)

In some embodiments, the method further comprises the step of deprotecting the compound of Formula (III) to produce a compound having the structure of Formula (IV):

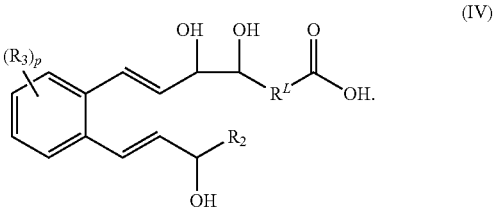

(IV)

For example, the compound may be an $A_4$ lipoxin mimetic such as (5S,6R,E)-5,6-dihydroxy-8-(2-((R,E)-3-hydroxyoct-1-en-1-yl)phenyl)oct-7-enoic acid which is Compound (IVa):

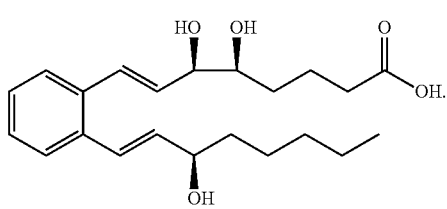
(IVa)

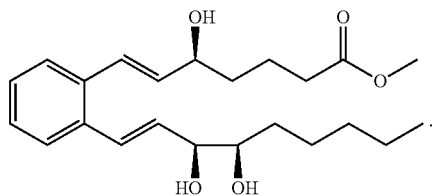
(Xb)

Typically, reaction media suitable for the deprotection allow for deprotection of all oxygen atoms with a protecting group attached thereto. Moreover, the deprotection may occur in one or more steps. For example, the deprotecting step occurs in a first environment comprising an organic solvent (e.g., tetrahydrofuran, etc.) comprising a quaternary ammonium salt (e.g., tetra-n-butylammonium fluoride, etc.) and a second environment (e.g., aqueous environment, such as $H_2O$, mixtures of $H_2O$ and lower alcohols including methanol and ethanol, organic environment, such as tetrahydrofuran, etc.) comprising a base such as an alkali metal hydroxide (e.g., LiOH, etc.).

Following deprotection, the method may further comprise the step of reacting said compound having the structure of Formula (IV) with an alkylating agent (e.g., halide, alkyl halide, heteroalkyl halide, arylalkyl halide such as benzyl halide, etc.) to form a compound having the structure of Formula (V):

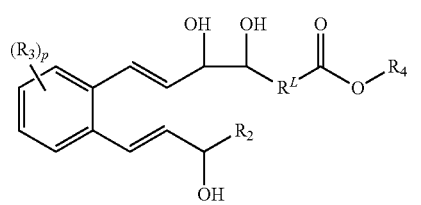
(V)

wherein $R_4$ is selected from hydrogen, saturated or unsaturated $C_1$-$C_7$ alkyl optionally substituted one or more times, and $C_1$-$C_7$ heteroalkyl optionally substituted one or more times; or carboxylate salts thereof. In specific implementations, $R_4$ is methyl, ethyl, propyl, or isopropyl. For example, the compound may be methyl (5S,6R,E)-5,6-dihydroxy-8-(2-((R,E)-3-hydroxyoct-1-en-1-yl)phenyl)oct-7-enoate (Compound Vb) having the structure:

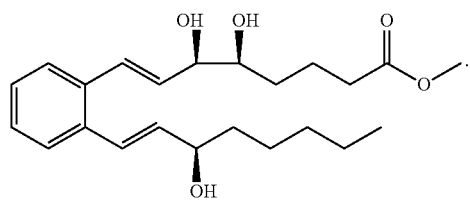
(Vb)

In some embodiments, the compound may be methyl (S,E)-7-(2-((3S,4R,E)-3,4-dihydroxynon-1-en-1-yl)phenyl)-5-hydroxyhept-6-enoate (Compound Xb) having the structure:

The method may any one or more of the reaction steps for synthesis of the pro-resolving analog (e.g., lipoxin mimetic such as lipoxin $A_4$ mimetics, etc.). Typically, at least one of the reaction steps occurs in a reaction medium with a basic pH. In some embodiments, each of the reaction steps occurs in a reaction medium with a basic pH (e.g., a pH greater than 7) or in a reaction medium with an apparent pH greater than 7. For example, in some embodiments, the method may comprise:

a) deprotecting a compound of Formula (III):

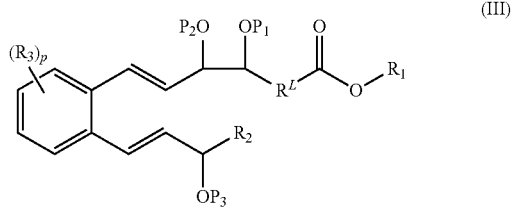
(III)

to produce a compound having the structure of Formula (IV):

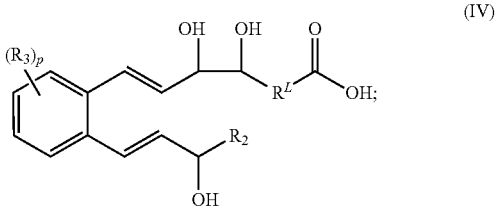
(IV)

and b) contacting the compound having the structure of Formula (IV) with an alkylating agent (e.g., alkyl halide, heteroalkyl halide, etc.) to form a compound having the structure of Formula (V):

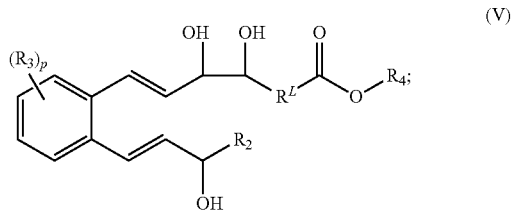
(V)

wherein p is an integer from 0-4;

$R_1$ is selected from hydrogen, saturated or unsaturated $C_1$-$C_7$ alkyl optionally substituted one or more times, and $C_1$-$C_7$ heteroalkyl optionally substituted one or more times;

$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;

$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;

wherein $R_4$ is selected from hydrogen, saturated or unsaturated $C_1$-$C_7$ alkyl optionally substituted one or more times, and $C_1$-$C_7$ heteroalkyl optionally substituted one or more times;

$R^L$ is absent or a divalent $C_1$-$C_7$ hydrocarbon (e.g., alkylene, heteroalkylene, etc.) optionally substituted one or more times;

$P_1$-$P_3$ are each independently a protecting group (e.g., trityl protecting group, silyl protecting group, etc.).

In certain implementations, the method may comprise:

a) contacting a compound having the structure of Formula (I):

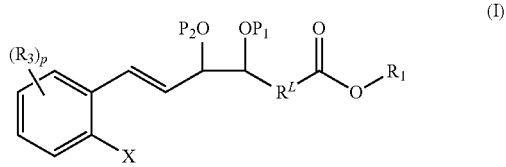

with a compound having the structure of Formula (II):

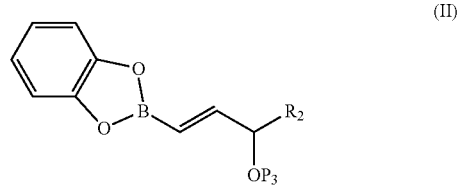

under in an environment suitable to form a compound having the structure of Formula (III) (e.g., a reaction environment with a pH greater than 7, a reaction environment with a pH greater than 7.2, etc.):

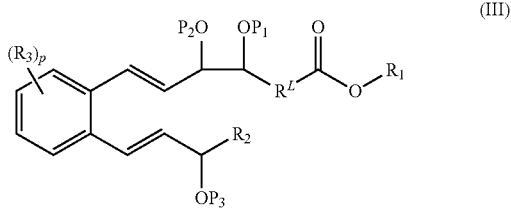

b) deprotecting said compound of Formula (III) to produce a compound having the structure of Formula (IV):

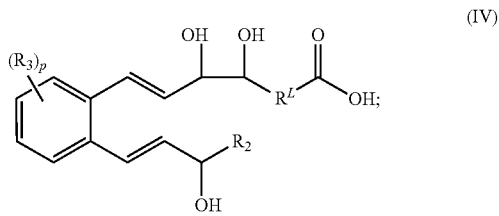

and c) contacting said compound having the structure of Formula (IV) with an alkylating agent (e.g., halide, alkyl halide, heteroalkyl halide, arylalkyl halide such as benzyl halide, etc.) to form a compound having the structure of Formula (V):

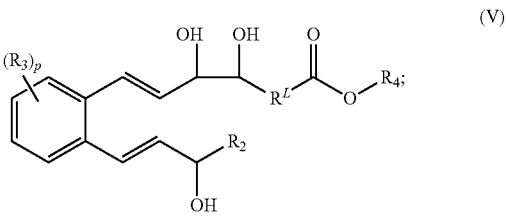

wherein p is an integer from 0-4;

$R_1$ is selected from hydrogen, saturated or unsaturated $C_1$-$C_7$ alkyl optionally substituted one or more times, and $C_1$-$C_7$ heteroalkyl optionally substituted one or more times;

$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;

$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;

wherein $R_4$ is selected from hydrogen, saturated or unsaturated $C_1$-$C_7$ alkyl optionally substituted one or more times, and $C_1$-$C_7$ heteroalkyl optionally substituted one or more times;

$R^L$ is absent or a divalent $C_1$-$C_7$ hydrocarbon (e.g., alkylene, heteroalkylene, etc.) optionally substituted one or more times;

$P_1$-$P_3$ are each independently a protecting group (e.g., trityl protecting group, silyl protecting group, etc.); and X is a halogen (e.g., bromine, etc.).

Methods for the synthesis of compounds having the structure of formula (I) are also provided within the disclosure. For some embodiments of the synthesis of lipoxin analogs, compounds having the structure of Formula (I) may be useful starting materials. These method for the compound (I) synthesis may comprise using L-deoxyribose as a starting material and reducing L-deoxyribose to form a suitable intermediate. In some embodiments, the method may comprise saturating (e.g., with $H_2$ and Pd/C, etc.) a triol as shown in Synthesis Route B below. For example, the triol may have have the structure:

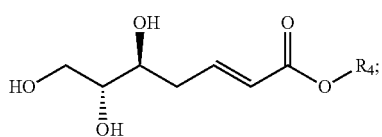

to form a triol having the structure:

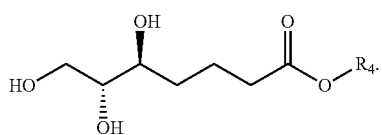

The method may comprise protecting each hydroxyl group of the triol to form a compound having the structure:

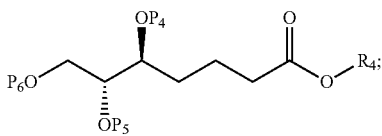

wherein $P_4$-$P_6$ are independently oxygen protecting groups. In certain embodiments, the method may comprise deprotection of one of these protecting groups to form a compound with a single hydroxyl group. In some implementations, the oxygen attached to P6 is deprotected at this step to form the structure:

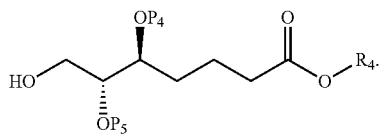

The method may comprise conversion of the single hydroxyl group compound to an aldehyde or a ketone (e.g., via Swern oxidation, etc.). For example, the method may comprise the formation of the aldehyde having the structure:

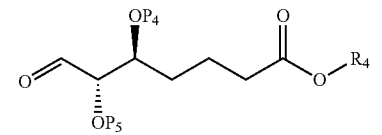

using oxalyl chloride in DMSO solvent. Furthermore, the method may comprise halogenating the aldehydes or ketones to form a halogenated intermediate via a process such as Takai olefination. The halogenated product may have the structure:

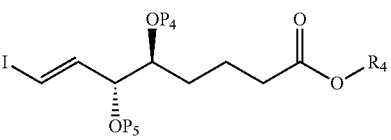

In various implementations, the method may comprise coupling the halogenated product to a halogenated phenyl moiety (present in embodiments of lipoxin analogs described herein) to form the compounds having the structure of formula (I). For example, the method may comprise coupling the halogenated product via a Suzuki reagent. A particular Suzuki reagent useful is bromophenyl boronic acid. Typically, the Suzuki reaction may occur with one or more catalysts (e.g., the transition metal catalysts of palladium or nickel such as $PdCl_2$, $Pd(OAc)_2$, $Pd_2(dba)_3$, Ni $(OAc)_2$ Ni/C, etc.), and or an alkali (e.g., sodium tert-butoxide, potassium tert-butoxide, potassium carbonate, cesium carbonate and tripotassium phosphate, etc.). The Suzuki reaction may occur in an aprotic solvent. In certain embodiments, The Suzuki reaction may occur in an aqueous environment. In some embodiments, the method for the synthesis of compounds having the structure of Formula (I) may comprise one or more (e.g., one, two, three, four, five, six, etc.) reaction steps described above.

In certain embodiments, the compounds described herein may have one or more oxygen protecting groups (e.g., $P_1$, $P_2$, $P_3$, $P_4$, $P_5$, $P_6$, etc.) which are sometimes referred to as hydroxyl protecting group. Oxygen protecting groups include, but are not limited to, —R, —N(R)R', —C(=O)SR, —C(=O)R, —CO$_2$R, —C(=O)N(R)R', —C(=NR)R', —C(=NR)OR', —C(=NR)N(R)R', —S(=O)R, —SO$_2$R, —Si(R)R'R", —P(R)R', —P(R)R'R", —P(=O)$_2$R, —P(=O)(R)R', —P(=O)(OR)(OR'), —P(=O)$_2$N(R)R', and —P(=O)(NR)NR', wherein R, R', and R" may be independently selected at each occurrence. In some embodiments, two R groups may together form a ring (e.g., fused ring, spiro ring, etc.). Oxygen protecting groups are well known in the art and include those described in detail in Protecting Groups in Organic Synthesis, T. W. Greene and P. G. M. Wuts, 3$^{rd}$ edition, John Wiley & Sons, 1999, incorporated herein by reference in its entirety. In specific embodiments, $P_1$-$P_3$ are each silyl protecting groups. For example, $P_1$-$P_3$ may each be tert-butyldimethylsilyl.

Various reaction steps of the disclosure require compounds with oxygen protecting groups. Exemplary oxygen protecting groups include, but are not limited to, methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a, 4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl (Bn), p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, .alpha.-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4''-tris(4,5-dichlorophthalimidophenyl)methyl, 4,4',4''-tris(levulinoyloxyphenyl)methyl, 4,4',4''-tris(benzoyloxyphenyl)methyl, 3-(imidazol-1-yl)bis(4',4''-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodisulfuran-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBS or TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), alkyl isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-napththyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxyacyl)benzoate, .alpha.-naphthoate, nitrate, alkyl N,N,N',N'-tetramethylphosphorodiamidate, t-butyloxycarbonyl (BOC or Boc), alkyl N-phenylcarbamate, borate, dimethylphosphinothioyl, alkyl 2,4-dinitrophenylsulfenate, sulfate, methanesulfonate (mesylate), benzylsulfonate, and tosylate (Ts).

The reaction to form the lipoxin analogs described herein may use one or more catalysts. For example, the reaction to form compounds having the structure of Formula (III) may take place in the presence of a catalyst. In certain embodiments, the catalyst may be a Groups 8 metal catalyst such as those described in in Chemical and Engineering News, 63(5), 27, 1985, hereby incorporated by reference in its entirety. Examples of such metals include Ni, Pt and Pd. In particular embodiments, the catalyst is a palladium catalyst. Examples of suitable palladium catalysts include but are not limited to $Pd_3(dba)_3$, $PdCl_2$, $Pd(OAc)_2$, $PdCl_2(dppf)CH_2Cl_2$, $Pd(PPh_3)_4$ and related catalysts which are complexes of phosphine ligands, (such as $(Ph_2P(CH_2)_nPPh_2)$ where n is 2 to 5, $P(o\text{-tolyl})_3$, $P(i\text{-Pr})_3$, $P(cyclohexyl)_3$, $P(O\text{-MeOPh})_3$, $P(p\text{-MeOPh})_3$, dppp, dppb, TDMPP, TTMPP, TMPP, TMSPP, 2-(di-t-butylphosphino)biphenyl, (R,R)-Me-DUPHOS, (S,S)-Me-DUPHOS, (R)-BINAP, (S)-BINAP, and related water soluble phosphines), related ligands (such as triarylarsine, triarylantimony, triarylbismuth), phosphite ligands (such as $P(OEt)_3$, $P(O\text{-p-tolyl})_3$, $P(O\text{-o-tolyl})_3$, $P(O\text{-iPr})_3$, tris(2,4-di-t-butylphenyl)phosphite and other examples described in the STREM Catalogue No. 18 (Chemicals for Research: metals, inorganics and organometallics 1999 2001)) and other suitable ligands including those containing P and/or N atoms for coordinating to the palladium atoms, (such as for example pyridine, alkyl and aryl substituted pyridines, 2,2'-bipyridyl, alkyl substituted 2,2'-bipyridyl and bulky secondary or tertiary amines), and other simple palladium salts either in the presence or absence of ligands. The palladium catalysts include palladium and palladium complexes supported or tethered on solid supports, such as palladium on carbon, as well as palladium black, palladium clusters and palladium clusters containing other metals and palladium in porous glass as described in J. Li, A. W-H. Mau and C. R. Strauss, Chemical Communications, 1997, p 1275. The same or different Group 8 metal catalysts may be used to catalyze different steps in the process.

In certain embodiments, one or more reaction steps take place in the presence of a platinum catalyst. Examples of suitable platinum catalysts include but are not limited to $Pt(dba)_2$, $Pt(PPh_3)_2Cl_2$, $PtCl_2$, $Pt(OAc)_2$, $PtCl_2(dppf)CH_2Cl_2$, $Pt(PPh_3)_4$ and related catalysts which are complexes of phosphine ligands, (such as $(Ph_2P(CH_2)_nPPh_2)$ where n is 2 to 5, $P(o\text{-tolyl})_3$, $P(i\text{-Pr})_3$, $P(cyclohexyl)_3$, $P(o\text{-MeOPh})_3$, $P(p\text{-MeOPh})_3$, dppp, dppb, TDMPP, TTMPP, TMPP, TMSPP, 2-(di-t-butylphosphino)biphenyl, (R,R)-Me-DUPHOS, (S,S)-Me-DUPHOS, (R)-BINAP, (S)-BINAP and related water soluble phosphines), related ligands (such as triarylarsine, triarylantimony, triarylbismuth), phosphite ligands (such as $P(OEt)_3$, $P(O\text{-p-tolyl})_3$, $P(O\text{-o-tolyl})_3$, $P(O\text{-iPr})_3$, tris(2,4-di-t-butylphenyl)phosphite and other suitable ligands including those containing P and/or N atoms for coordinating to the platinum atoms, (such as for example pyridine, alkyl and aryl substituted pyridines, 2,2'-bipyridyl, alkyl substituted 2,2'-bipyridyl and bulky secondary or tertiary amines), and other simple platinum salts either in the presence or absence of ligands. The platinum catalysts include platinum and platinum complexes supported or tethered on solid supports, such as platinum on carbon, as well as platinum black, platinum clusters and platinum clusters containing other metals.

Increased basicity may lead to increased stability and increased yields in any of the reaction steps. For example, in certain embodiments, one or more reaction steps may proceed in an environment with a basic pH or a basic apparent pH (e.g., a reaction environment with a pH greater than 7, a reaction environment with a pH greater than 7.2, etc.). In certain implementations, the reaction medium may include one or more buffers or pH adjusters including phosphates of alkali metals, such as monosodium phosphate, disodium phosphate, potassium phosphates, and tripolyphosphates; sodium hydroxide; sulfuric acid; perchlorate; and combinations thereof. In certain implementations, any reaction step described herein may use one or more bases. For example, some reaction steps may be performed in an environment comprising one or a mixture of two or more bases selected from the group consisting of potassium phosphate monobasic ($KH_2PO_4$), sodium phosphate dibasic dihydrate ($Na_2HPO_4 \cdot 2H_2O$), sodium phosphate dibasic ($Na_2HPO_4$), sodium carbonate ($Na_2CO_3$), sodium phosphate monobasic ($NaH_2PO_4$), lithium acetate (LiOAc), lithium carbonate ($Li_2CO_3$), sodium acetate (NaOAc), potassium phosphate dibasic ($K_2HPO_4$), potassium phosphate tribasic ($K_3PO_4$), potassium carbonate ($K_2CO_3$), cesium fluoride (CsF), potassium bicarbonate ($KHCO_3$), potassium hydroxide (KOH), potassium fluoride (KF), potassium hexafluorophosphate ($KPF_6$), potassium acetate (KOAc), sodium fluoride (NaF), cesium acetate (CsOAc), cesium pivalate (CsOPiv), lithium hexafluorophosphate (LiPF$_6$), lithium phosphate (Li$_3$PO$_4$), lithium fluoride (LiF), and lithium iodide (LiI). In particular embodiments, NaOAc, K$_2$HPO$_4$, or KOAc may be used as the base. In certain implementations the reaction to form compounds having the structure of Formula (III) and/or the alkylation reaction involves the use of base such as an alkali carbonate (e.g., potassium carbonate, etc.). In some embodiments, any reaction step may comprise an alkali carbonate selected from the group consisting of Na$_2$CO$_3$, K$_2$CO$_3$, Cs$_2$CO$_3$, and Li$_2$CO$_3$. In various implementations, compounds may be deprotected in the presence of well. In specific embodiments, compounds having the structure of Formula (III) (e.g., compounds having the structure of Formula (IIIa), etc.) may be deprotected with a base such as LiOH.

In some embodiments, a reaction step may have a molar ratio of compounds having the structure of Formula (I) to alkali carbonate is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.). In some embodiments, the reaction has a molar ratio of compounds having the structure of Formula (II) to alkali carbonate is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.). In some embodiments, the reaction has a molar ratio of compounds having the structure of Formula (IV) to alkali carbonate is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.).

The alkylation of compounds having the structure of Formula (IV) occurs using one or more alkylating agents. Exemplary alkylating agents include alkyl halides and benzyl halides. In certain implementations, the alkylating agent may be selected from methyl iodide (CH$_3$I), ethyl iodide (C$_2$H$_5$I), and benzyl bromide (BnBr). In certain embodiments, the reaction may have a molar ratio of compounds having the structure of Formula (IV) to alkylating agent is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.). In an even more particular embodiment, a molar ratio of compounds having the structure of Formula (IV) to alkali carbonate base is from 2:1 to 1:2 and a molar ratio of the compound to alkylating agent is from 3:1 to 1:3. In other embodiments, the compound may be alkylated prior to deprotection. For example, in some embodiments, the reaction may have a molar ratio of compounds having the structure of Formula (III) to alkylating agent is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.). In certain implementations, the molar ratio of compounds having the structure of Formula (III) to alkali carbonate base is from 2:1 to 1:2 and the molar ratio of the compound to alkylating agent is from 3:1 to 1:3.

In some embodiments, a reaction step may have a molar ratio of compounds having the structure of Formula (VI) to alkali carbonate is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.). In some embodiments, the reaction has a molar ratio of compounds having the structure of Formula (II) to alkali carbonate is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.). In some embodiments, the reaction has a molar ratio of compounds having the structure of Formula (IV) to alkali carbonate is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.).

The alkylation of compounds having the structure of Formula (IX) occurs using one or more alkylating agents. Exemplary alkylating agents include alkyl halides and benzyl halides. In certain implementations, the alkylating agent may be selected from methyl iodide (CH$_3$I), ethyl iodide (C$_2$H$_5$I), and benzyl bromide (BnBr). In certain embodiments, the reaction may have a molar ratio of compounds having the structure of Formula (IV) to alkylating agent is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.). In an even more particular embodiment, a molar ratio of compounds having the structure of Formula (IV) to alkali carbonate base is from 2:1 to 1:2 and a molar ratio of the compound to alkylating agent is from 3:1 to 1:3. In other embodiments, the compound may be alkylated prior to deprotection. For example, in some embodiments, the reaction may have a molar ratio of compounds having the structure of Formula (III) to alkylating agent is from 10:1 to 1:10 (e.g., from 5:1 to 1:5, from 3:1 to 1:3, from 10:1 to 1:1, from 1:1 to 1:10, from 5:1 to 1:1, from 3:1 to 1:1, from 1:1 to 1:5, from 1:1 to 1:3, from 2:1 to 1:2, from 2:1 to 1:1, from 1:1 to 1:2, etc.). In certain implementations, the molar ratio of compounds having the structure of Formula (III) to alkali carbonate base is from 2:1 to 1:2 and the molar ratio of the compound to alkylating agent is from 3:1 to 1:3.

Typically, the reaction steps disclosed herein occur in solvent suitable to promote the reaction step (e.g., reduction, hydrogenation, oxidation, coupling, etc.). In certain embodiments, the reaction environment is aqueous. In some embodiments, the reaction environment is non-aqueous. In certain implementations, the reaction comprising an organic solvent such as an aliphatic or cyclic ether solvent. In some embodiments, any of the reaction steps described herein may include an aprotic or protic solvent such as dimethylformamide (DMF), dimethylsulfoxide (DMSO), dimethylacetamide (DMA), N-methyl-2-pyrrolidone (NMP), and acetonitrile (CH$_3$CN). In particular embodiments, the solvent is tetrahydrofuran (THF). In some embodiments, the medium for any reaction step is performed in an environment with a basic pH or a basic apparent pH.

The lipoxin analogs (e.g., lipoxin mimetics) described herein are useful for the treatment of a disorder, such as an oral disorder or an inflammatory condition. Oral disorders may be a disorder, disease, or condition which is caused or characterized by an abnormally low or insufficient level of oral bone (e.g., bone in the oral cavity, etc.). Exemplary oral bones include alveolar bone and basal bone. Some oral disorders which may be treated or prevented by increasing bone mass or bone growth through administration described herein include periodontal disease, alveolar bone loss, gingivitis, osteoporosis, osteopenia, oral bone resection, oral bone fracture, arthritis, osteoarthritis, osteotomy bone loss, childhood idiopathic bone loss, and the like. Destructive oral bone disorders that can be treated according to the disclosure include osteoporosis, osteopenia, osteoarthritis and osteolytic lesions such as those caused by neoplastic disease, radiotherapy, or chemotherapy. Also contemplated by the present invention is the regeneration of other oral tissues including soft tissues, epithelium, and connective tissues, such as collagen and blood vessels.

In some embodiments, periodontal diseases can be treated or prevented by using lipoxin analogs to increase osteogenesis. A periodontium is a tissue which is present around teeth and plays a role in supporting teeth. The periodontium is composed of at least gingiva, alveolar bone, periodontal ligament (periodontal membrane), cementum, and dental pulp. Among periodontium inflammations, an inflammation confined to the gum is referred to as gingivitis, while the case where inflammation sites extend beyond the gum to include damage and/or breakage of the periodontal membrane and/or alveolar bone is referred to as periodontitis. A general term of these inflammations is periodontal disease. Periodontal diseases may also encompass a larger set of inflammatory diseases affecting the periodontium. For example, such diseases include dental plaque-induced gingival diseases; chronic (previously adult) periodontitis; aggressive periodontitis (formerly early-onset, prepubertal, juvenile or rapidly progressive periodontitis); necrotizing periodontal diseases; abscesses of the periodontium; and post-operative bacterial infections (in particular those which are caused, transmitted and/or exacerbated by *P. gingivalis*).

Periodontitis involves progressive loss of the alveolar bone around the teeth, and, if left untreated, can lead to the loosening and subsequent loss of teeth. Periodontitis is caused by microorganisms that adhere to and grow on the tooth's surfaces, along with an overly aggressive immune response, against these microorganisms. Diagnosis of periodontal disease in general or periodontitis specifically is usually performed by measurement of a periodontal pocket, attachment level, X-ray image diagnosis, or the like. Periodontitis manifests as painful, red, swollen gums, with abundant plaque. Symptoms may include redness or bleeding of gums while brushing teeth, using dental floss, or biting into hard food (e.g., apples); recurrent swelling of the gum; halitosis and a persistent metallic taste in the mouth; gingival recession resulting in apparent lengthening of teeth; deep pockets between the teeth and the gums (pockets are sites where the attachment has been gradually destroyed by collagenases); and loose teeth. Thus, associated symptoms which may be treated according to the present invention include mouth ulcers, dental pain, discomfort, inflammation, bleeding, pus secretion, halitosis, tooth mobility, tooth loss, swelling or inflammation caused by any of the foregoing.

Typically, inflammatory conditions are those disease states characterized by inflammatory tissues (for example, infiltrates of cells such as leukocyctes, neutrophils, macrophages, eosinophils, mast cells, basophils, dendritic cells, etc.). These disease states may provoke or contribute to the abnormal clinical and histological characteristics of a disease state. Inflammatory conditions which may be treated with the compositions described herein include inflammatory conditions of the skin or inflammatory conditions of the eye, or sepsis-associated conditions. For example, the compositions described herein may be useful for the treatment of prophylaxis of an inflammation of the skin such as Sweet's syndrome, pyoderma gangrenosum, subcorneal pustular dermatosis, erythema elevatum diutinum, Bechet's disease or acute generalized exanthematous pulstulosis, bullous disorder, psoriasis, a condition resulting in pustular lesions, acne, acne vulgaris, dermatitis (e.g., contact dermatitis, atopic dermatitis, seborrheic dermatitis, eczematous dermatitis, photoallergic dermatitis, phototoxic dermatitis, phytophotodermatitis, radiation dermatitis, stasis dermatitis, allergic contact dermatitis, etc.), ezema such as asteatotic eczema, ulcers and erosions resulting from trauma, burns, ischemia of the skin or mucous membranes, ichthyoses, epidermolysis bullosae, hypertrophic scars, keloids, cutaneous changes from aging, photaging, frictional blistering caused by mechanical shearing of the skin, cutaneous atrophy resulting from the topical use of corticosteroids, cheilitis, chapped lips, nasal irritation, mucositis, and vulvovaginitis. The compositions may also be useful for the treatment of inflammatory conditions of the eye such as dry eye syndrome, uveitis (including iritis), conjunctivitis, scleritis, and keratoconjunctivitis sicca. In certain implementations, the treatment or prophylaxis of these conditions may occur by administration of topical anti-inflammatory compositions as described herein may be applied to areas affected by such conditions.

Typically, the method for the treatment or prophylaxis of a disorder in a subject in need thereof comprise administration of a pharmaceutical composition comprising one or more compounds having the structure of formula (IV) or formula (V), or formula (IX) or formula (X), or carboxylate salts thereof. In certain embodiments, compound Va may be administered. The disorder may be selected from periodontitis, alveolar bone loss, gingivitis, osteoporosis, osteopenia, oral bone resection, oral bone fracture, arthritis, osteoarthritis, osteotomy bone loss, osteolytic lesions, idiopathic bone loss (e.g., childhood idiopathic bone loss, etc.). In specific embodiments, the oral disorder is a periodontal disease (e.g., from periodontitis, gingivitis, chronic periodontitis, aggressive periodontitis, necrotizing periodontal disease, aggressive periodontitis, periodontium abscesses, post-operative gingival infections, etc.).

The pharmaceutical compositions (e.g., oral care compositions, etc.) typically comprise one or more pharmaceutically acceptable carriers, excipients, and/or diluents and a compound having the structure of Formula (V) or (X):

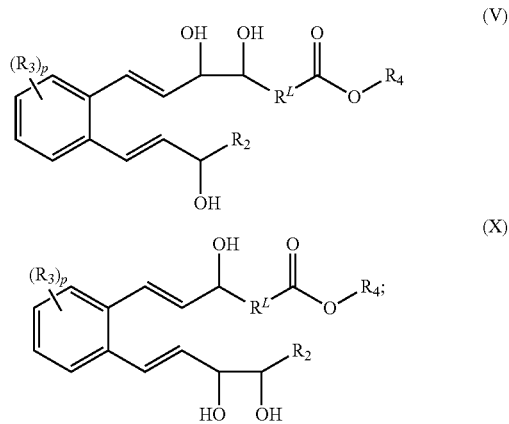

or carboxylate salts thereof;
wherein p is an integer from 0-4;
$R_1$ is selected from hydrogen, saturated or unsaturated $C_1$-$C_7$ alkyl optionally substituted one or more times, and $C_1$-$C_7$ heteroalkyl optionally substituted one or more times;
$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;

$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;

$R^L$ is absent or a divalent $C_1$-$C_7$ hydrocarbon (e.g., alkylene, heteroalkylene, etc.) optionally substituted one or more times; and the pH of said composition is greater than 7. In some embodiments, the pH is greater than 7.2. The composition may comprise the compound having the structure of Formula (V) in an amount from 0.01% to 50% (e.g., from 0.01% to 0.1%, from 0.1% to 1%, from 1% to 10%, from 1% to 50%, from 10% to 20% from 20% to 30% from 30% to 40%, from 40% to 50%, etc.) by weight of the composition. In certain implementations, the pharmaceutical composition comprising one or more pH adjusting agents and/or buffers such as magnesium hydroxide; sodium hydroxide; aluminum hydroxide; alginic acid; isotonic saline; Ringer's solution; ethyl alcohol; or phosphate buffer solution. In specific embodiments, the composition is formulated for topical administration of the compound. For example, the composition may be formulated as a mouth rinse, tooth paste, dentifrice, buccal patch, dental fiber, dental tape, chewing gum, food additive, lozenge, tablet, or chewable capsule.

The composition may comprise a compound having the structure:

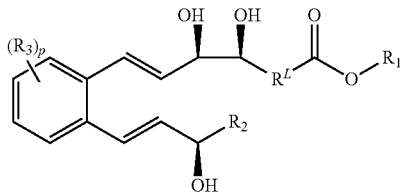

In some embodiments, the composition comprises a compound having the structure:

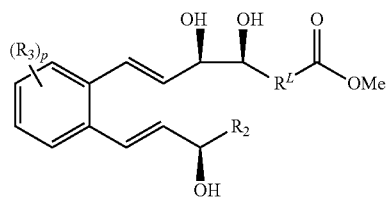

In specific implementations, the composition comprises a compound having the structure:

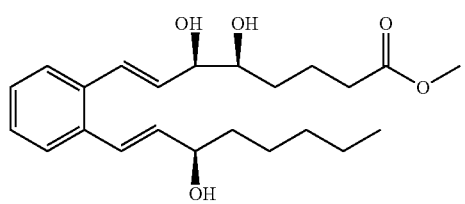

Increased basicity may lead to increased of the ester form of these compounds and therefore increased stability during formulations. For example, in certain embodiments, one or more reaction steps may proceed in an environment with a basic pH or a basic apparent pH (e.g., a pH (or apparent pH) greater than 7, a pH (or apparent pH) greater than 7.2, etc.). In certain implementations, the reaction medium may include one or more buffers or pH adjusters including phosphates of alkali metals, such as monosodium phosphate, disodium phosphate, potassium phosphates, and tripolyphosphates; sodium hydroxide; sulfuric acid; perchlorate; and combinations thereof. In certain implementations, any reaction step described herein may use one or more bases. For example, some reaction steps may be performed in an environment comprising one or a mixture of two or more bases selected from the group consisting of potassium phosphate monobasic ($KH_2PO_4$), sodium phosphate dibasic dihydrate ($Na_2HPO_4 \cdot 2H_2O$), sodium phosphate dibasic ($Na_2HPO_4$), sodium carbonate ($Na_2CO_3$), sodium phosphate monobasic ($NaH_2PO_4$), sodium acetate (NaOAc), potassium phosphate dibasic ($K_2HPO_4$), potassium phosphate tribasic ($K_3PO_4$), potassium carbonate ($K_2CO_3$), potassium bicarbonate ($KHCO_3$), potassium hydroxide (KOH), potassium fluoride (KF), potassium acetate (KOAc), and sodium fluoride (NaF). In particular embodiments, NaOAc, $K_2IPO_4$, or KOAc may be used as the base.

In certain implementations, the composition may include buffers selected from anhydrous carbonates such as sodium carbonate, sesquicarbonates, bicarbonates such as sodium bicarbonate, silicates, bisulfates, phosphates (e.g., monopotassium phosphate, dipotassium phosphate, tripotassium phosphate, disodium phosphate, tribasic sodium phosphate, sodium tripolyphosphate, phosphoric acid), citrates (e.g., citric acid, trisodium citrate dehydrate), pyrophosphates (sodium and potassium salts) and combinations thereof. The amount of buffering agent is sufficient to provide a pH of greater than 7 (e.g., greater than 7.2, from 7 to 8, from 7.2 to 8 from 7.2 to 7.5, etc.) in aqueous or liquid based compositional forms (e.g. oral rinses, etc.). Typical amounts of buffering agent are about 5% to about 35%, in one embodiment about 10% to about 30%, in another embodiment about 15% to about 25%, by weight of the total composition.

An exemplary composition includes from 50% to 90% solvent (e.g., water, lower alcohols such as ethanol, propylene glycol etc.) by weight of the composition, additional agreements such as sweeteners, flavoring agents humectants, and surfactants (e.g., from 0.1 to 20%, etc.) by weight of the composition, one or more buffering agents to maintain a pH of greater than 7 (e.g., in an amount of from 1% to 40%, from 5% to 35%, from 10% to 30%, from 15% to 25% by weight of the composition, etc.) and a concentration of lipoxin mimetic (e.g., lipoxin-A4 mimetic, lipoxin-B4 mimetic, compounds having the structure of formula (V), compounds having the structure of formula (X), Compound (Vb), Compound (Xb), etc.). The lipoxin mimetic may be present in an amount of from 0.1 µM to 100 µM (e.g., from 0.1 µM to M, from 10 µM to 100 µM, etc.). In certain embodiments, the composition comprises a phosphate buffer (e.g., dipotassium phosphate, tripotassium phosphate, disodium phosphate, tribasic sodium phosphate, etc.).

In some embodiments, the lipoxin mimetic may be administered to a subject topically. In some embodiments, the active compound may be formulated in topical dosage forms such as creams, lotions, ointments, gels, shampoos, sprays, aerosols, solutions, or emulsions. See, e.g., Remington: The Science and Practice of Pharmacy, 21st Ed., Lippincott, Williams, and Wilkins, Philadelphia Pa. (2005); and Ansel's Pharmaceutical Dosage Forms and Drug Delivery Systems, 9$^{th}$ Ed., Lippincott, Williams, and Wilkins, Philadelphia, Pa. (2011) each hereby incorporated by reference in their entirety. For non-sprayable topical dosage forms, viscous to semi-solid or solid forms comprising a carrier or one or more excipients compatible with topical application and having a dynamic viscosity preferably greater than water are typically employed. Suitable formulations include, without limitation, solutions, suspensions, emulsions, creams, ointments, powders, liniments, salves, and the like, which are, if desired, sterilized or mixed with auxiliary agents (e.g., preservatives, stabilizers, wetting agents, buffers, salts, etc.) for influencing various properties, such as, for example, osmotic pressure. Other suitable topical dosage forms include sprayable aerosol preparations wherein the active ingredient, preferably in combination with a solid or liquid inert carrier, is packaged in a mixture with a pressurized volatile (e.g., a gaseous propellant such as Freon, etc.), or in a squeeze bottle. Moisturizers or humectants can also be added to pharmaceutical compositions and dosage forms if desired.

In some embodiments, the lipoxin analogs described herein may be formulated with a physiologically compatible carrier medium. Such media can be of any simple type, for example, a pharmaceutically acceptable carrier such as fructo-oligo-saccharide (FOS) medium, or other soluble fiber, sugar, nutrient or base material for the composition, with which the lipoxin analog can be formulated. In certain embodiments, the lipoxin analog may be formulated in an orally administrable form. Other non-limiting, exemplary carrier media include mannitol, inulin (a polysaccharide), polydextrose, arabinogalactan, polyolslactulose, lactitol, etc.

The carrier medium, when present, can be mixed or blended with lipoxin analogs in any suitable amounts to form a pharmaceutical composition, such as an amount of from 5% to 95% by weight of the composition. In some embodiments, the amount of carrier medium can be in a range having a lower limit of any of 5%, 10%, 12%, 15%, 20%, 25%, 28%, 30%, 40%, 50%, 60%, 70% or 75%, and an upper limit, higher than the lower limit, of any of 20%, 22%, 25%, 28%, 30%, 40%, 50%, 60%, 70%, 75%, 80%, 85%, 90%, and 95%. The amount of carrier medium in a specific embodiment may be determined based on considerations of the specific dose form, relative amounts of lipoxin analogs, the total weight of the composition including the carrier medium and the bacterial species, and the physical and chemical properties of the carrier medium, and other factors.

In certain implementations, the compounds described herein may be formulated for oral administration. In some embodiments, the oral administration is targeted for application to the oral cavity, such as by applying the compositions and active ingredients contained therein to surfaces of the oral cavity, including but not limited to salivary glands, saliva, gingiva, dental plaque, teeth, tongue, cheek tissue, and the like. In some embodiments, the formulation is intended to adhere or otherwise contact the surgical wound area during periodontal flap surgery. Typically, orally acceptable carriers are those which are composed of one or more safe solid or liquid diluents or encapsulating substances compatible with the compounds described herein and are suitable for topical oral administration. These compatible substances may be mixed with the active compounds described herein without interaction in a manner which would substantially reduce the stability and/or efficacy of the active compound. Non-exclusive examples of such orally acceptable carriers include distilled or deionized water, calcium carbonate, calcium citrate, bentonite, and montmorillonite.

Pharmaceutical compositions comprising the active compounds (e.g., compounds having the structure of Formula (V), Compound (Vb), etc.) described herein include any composition suitable for topical administration (e.g., to the oral cavity, to the skin, to the eye, etc.) of a human or animal subject for enhancing the health, hygiene or appearance of the subject. In certain embodiments, the pharmaceutical composition may provide such benefits as: the prevention or treatment of a condition or disorder of the teeth, gums, mucosa or other hard or soft tissue of the oral cavity; the prevention or treatment of an oral disorder that would benefit from increased oral osteogenesis; and combinations thereof. In various embodiments, an oral care composition is not intentionally swallowed for purposes of systemic administration of components of the composition, but is rather retained in the oral cavity for a time sufficient to contact substantially all of oral tissues for purposes of oral activity. The pharmaceutical composition of the present invention may be in the form of a capsule, cachets, pills, lozenge, granules, toothpaste, tooth gel, subgingival gel, dentifrice, tooth powder, mouth rinse, denture product, mouth spray, oral tablet, oral device, chewing gum, oil-in-water emulsion, water-in-oil emulsion, elixir, syrup, or pastille using an inert base, such as gelatin and glycerin, or sucrose and acacia), or encapsulated in resorbable carrier nanoparticles of biologic or synthetic origin. Particles containing at least one component of a cellular-derived microparticle are described in (published online Apr. 1, 2011) and in WO 2012/135032, both of which are incorporated herein in their entirety by reference. In certain embodiments, the lipoxin mimetics described herein may be formulated in a cellular derived microparticle or nanoparticle generated during the initiation phase of an acute inflammatory response. Such particles are described in US 2014/0079631 hereby incorporated by reference in its entirety and specifically in relation to its microparticle and nanoparticle delivery vehicles. In some embodiments, the particle can be of a size from about 1 nm to about 1.5 m in diameter. In some embodiments, the particle can be of a size from about 10 nm to about 1 m in diameter. In some embodiments, the particle can be of a size from about 100 nm to about 1 m in diameter. In some embodiments, the particle can be of a size from about 100 nm to about 0.5 m in diameter. In some embodiments, the particle can be of a size from about 150 nm to about 250 nm in diameter. In some embodiments, the particle can be of a size from about 450 nm to about 550 nm in diameter. In some embodiments, the particle can be of a size of about 200 nm in diameter. In some embodiments, the particle can be of a size of about 500 nm in diameter. In some embodiments, the particle can be of a size of about 1100 nm in diameter. The particle size may be measured by dynamic light scattering.

In certain embodiments, an oral care composition is disclosed. The oral care composition may comprise any of the lipoxin analogs described herein. In certain embodiments, the oral care composition may be any of the following selected from the group consisting of: a toothpaste or a dentifrice, a mouthwash or a mouth rinse, a topical oral gel and a denture cleanser. In certain embodiments, the oral care composition further comprises one or more agents selected from diluents, bicarbonate salts, pH modifying agents, surfactants, foam modulators, additional thickening agents, humectants, sweeteners, flavorants, pigments, antibacterial agents, anticaries agents, fluoride ion sources, anticalculus or tartar control agents, and mixtures thereof. Oral compositions disclosed herein may also be incorporated onto strips or films for the application or attachment to oral surfaces. In certain embodiments, implants can be used, such as a chip for insertion into a periodontal pocket; a dental filling, bridge or cap; and a denture. In solid dosage forms for oral administration (capsules, tablets, pills, dragees, powders, granules and the like), the active ingredient is mixed with one or more pharmaceutically-acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, acetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof, and (10) coloring agents. In the case of capsules, tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (e.g., gelatin, hydroxypropylmethyl cellulose, etc.), lubricant, inert diluent, preservative, disintegrant (e.g., sodium starch glycolate or cross-linked sodium carboxymethyl cellulose, etc.), surface-active or dispersing agent. Molded tablets may be made by molding in a suitable machine a mixture of the powdered peptide or peptidomimetic moistened with an inert liquid diluent Tablets, and other solid dosage forms, such as dragées, capsules, pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be sterilized by, for example, filtration through a bacteria-retaining filter, or by incorporating sterilizing agents in the form of sterile solid compositions, which can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions, which can be used include polymeric substances and waxes. The active ingredient can also be in micro-encapsulated form, if appropriate, with one or more of the above-described excipients.

Liquid dosage forms for oral administration include pharmaceutically acceptable emulsions, microemulsions, solutions, suspensions, syrups and elixirs. In addition to the active ingredient, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof Suspensions, in addition to the active agent, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

The pharmaceutical composition may optionally include other materials, such as for example, cleaning agents, flavouring agents, sweetening agents, adhesion agents, surfactants, foam modulators, abrasives, pH modifying agents, humectants, moisturizers, mouth feel agents, colorants, abrasives, preservatives, fluoride ion source, saliva stimulating agents, emollients, viscosity modifiers, diluents, emulsifiers, nutrients and combinations thereof. Various components that may be added to the oral composition include, for example, a sweetening agent such as saccharin, or sodium saccharin, alcohols such as ethanol, fluoride ion sources such as sodium fluoride, as well as glycerine, sorbitol, polyethylene glycols. Poloxamer polymers such as POLOXOMER® 407, PLURONIC® F108, (both available from BASF Corporation), alkyl polyglycoside (APG), polysorbate, PEG40, castor oil, menthol, and the like. It is understood that while general attributes of each of the above categories of materials may differ, there may be some common attributes and any given material may serve multiple purposes within two or more of such categories of materials. Preferably, such carrier materials are selected for compatibility with the active ingredients found in *magnolia* extract or synthetic analogues thereof, as well as with other ingredients of the composition.

Flavorants among those useful herein include any material or mixture of materials operable to enhance the taste of the composition. Any orally acceptable natural or synthetic flavorant can be used, such as flavoring oils, flavoring aldehydes, esters, alcohols, similar materials, and combinations thereof. Flavorants include vanillin, sage, marjoram, parsley oil, spearmint oil, cinnamon oil, oil of wintergreen (methylsalicylate) peppermint oil, clove oil, bay oil, anise oil, *eucalyptus* oil, citrus oils, fruit oils and essences including those derived from lemon, orange, lime, grapefruit, apricot, banana, grape, apple, strawberry, cherry, pineapple, etc., bean- and nut-derived flavors such as coffee, cocoa, cola, peanut, almond, etc., adsorbed and encapsulated flavorants, and mixtures thereof. Also encompassed within flavorants herein are ingredients that provide fragrance and/or other sensory effect in the mouth, including cooling or warming effects. Such ingredients include menthol, menthyl acetate, menthyl lactate, camphor, *eucalyptus* oil, eucalyptol, anethole, eugenol, *cassia*, oxanone, [alpha]-irisone, propenyl guaiethol, thymol, linalool, benzaldehyde, cinnamaldehyde, N-ethyl-p-menthan-3-carboxamine, N,2,3-trimethyl-2-isopropylbutanamide, 3-1-menthoxypropane-1,2-diol, cinnamaldehyde glycerol acetal (CGA), methane glycerol acetal (MGA) and mixtures thereof. One or more flavorants are optionally present in a total amount of 0.01% to 5%, optionally in various embodiments from 0.05 to 2%, from 0.1% to 2.5%, and from 0.1 to 0.5%.

In certain implementations the composition may comprise one or more sweetening agents. Sweetening agents among those useful herein include dextrose, polydextrose, sucrose, maltose, dextrin, dried invert sugar, mannose, xylose, ribose, fructose, levulose galactose, corn syrup, partially hydrolyzed starch, hydrogenated starch hydrolysate, sorbitol, mannitol, xylitol, maltitol, isomalt, aspartame, neotame, saccharin and salts thereof, sucralose, dipeptide-based intense sweeteners, cyclamates, dihydrochalcones, and mixtures thereof.

Mouth-feel agents include materials imparting a desirable texture or other feeling during use of the composition of the present disclosure.

Colorants among those useful to the compositions disclosed herein include pigments, dyes, lakes and agents imparting a particular luster or reflectivity such as pearling agents. In various embodiments, colorants are operable to provide a white or light-colored coating on a dental surface, to act as an indicator of locations on a dental surface that have been effectively contacted by the composition, and/or to modify appearance, in particular color and/or opacity, of the composition to enhance attractiveness to the consumer. Any orally acceptable colorant can be used, including FD&C dyes and pigments, talc, mica, magnesium carbonate, calcium carbonate, magnesium silicate, magnesium aluminum silicate, silica, titanium dioxide, zinc oxide, red, yellow, brown and black iron oxides, ferric ammonium ferrocyanide, manganese violet, ultramarine, titaniated mica, bismuth oxychloride, and mixtures thereof. One or more colorants are optionally present in a total amount of 0.001% to 20%, for example 0.01% to 10% or 0.1% to 5%.

In some embodiments, the compositions of the present disclosure contain a buffering agent. Examples of buffering agents include anhydrous carbonates such as sodium carbonate, sesquicarbonates, bicarbonates such as sodium bicarbonate, silicates, bisulfates, phosphates (e.g., monopotassium phosphate, dipotassium phosphate, tribasic sodium phosphate, sodium tripolyphosphate, phosphoric acid), citrates (e.g. citric acid, trisodium citrate dehydrate), pyrophosphates (sodium and potassium salts) and combinations thereof. The amount of buffering agent is sufficient to provide a pH of 5 to 9, preferable 6 to 8, and more preferable 7, when the composition is dissolved in water, a mouth rinse base, or a toothpaste base. Typical amounts of buffering agent are 5% to 35%, in one embodiment 10% to 30%, in another embodiment 15% to 25%, by weight of the total composition.

EXAMPLES

The following examples illustrate specific aspects of the instant description. The examples should not be construed as limiting, as the example merely provides specific understanding and practice of the embodiments and its various aspects. The synthetic examples below are not particularly limiting, and other methodologies to synthesize the compounds of the present invention are well known to persons of skill in the art.

Example 1: Synthesis of Lipoxin Analogs

Compounds having a Formula (II)-(V) (e.g., Compound IIa, Compound IIIa, Compound IVa, and Compound Va, etc.) were synthesized using Synthesis Route A.

Synthesis Route A

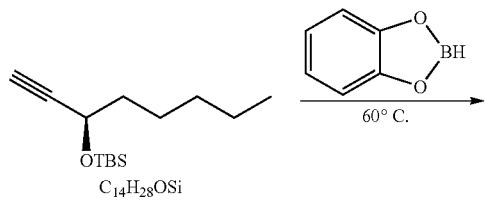

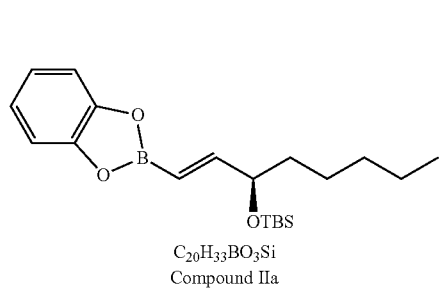

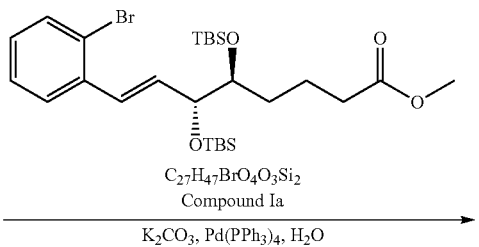

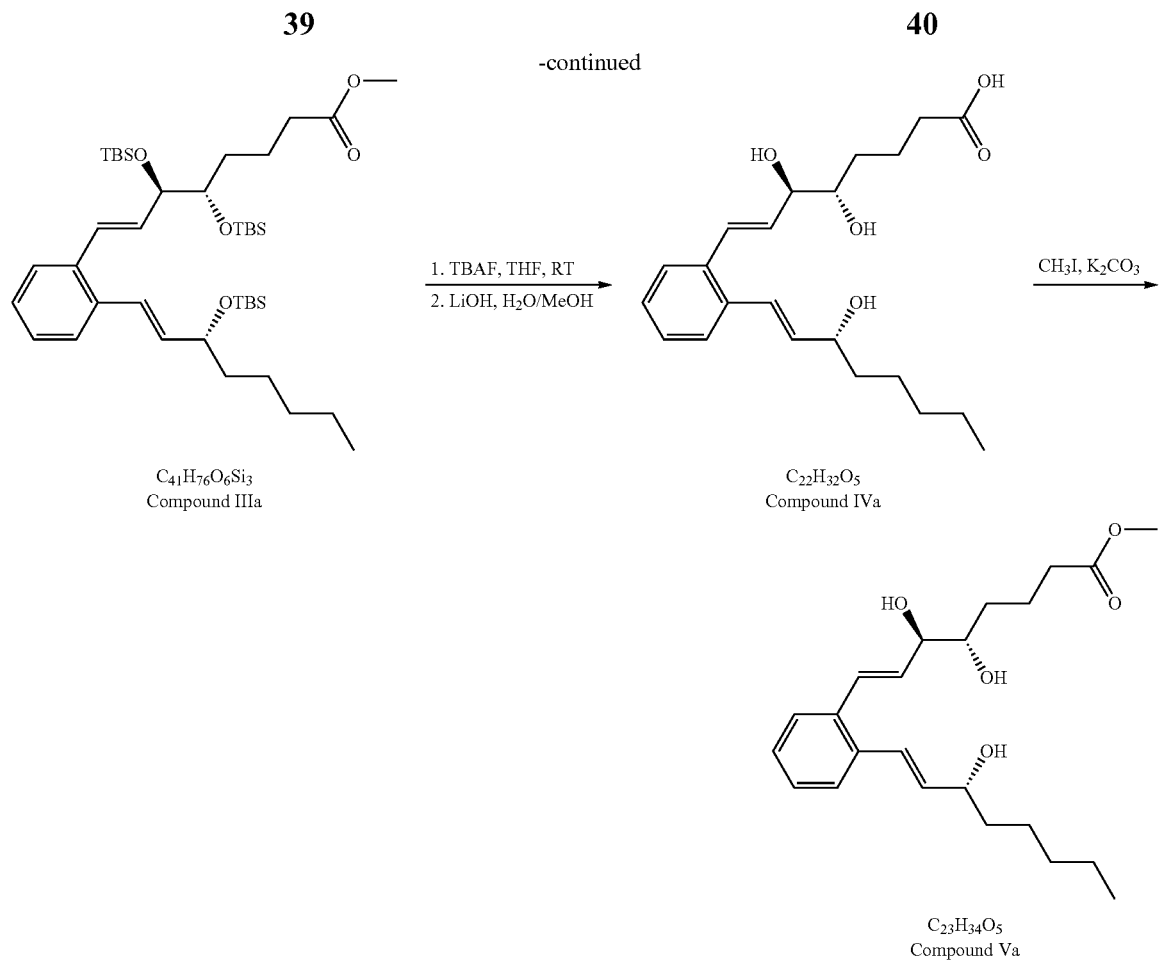
Compounds having the formula of Formula (I) (e.g., Compound IA) were synthesized using Synthesis Route B starting from L-deoxyribose.
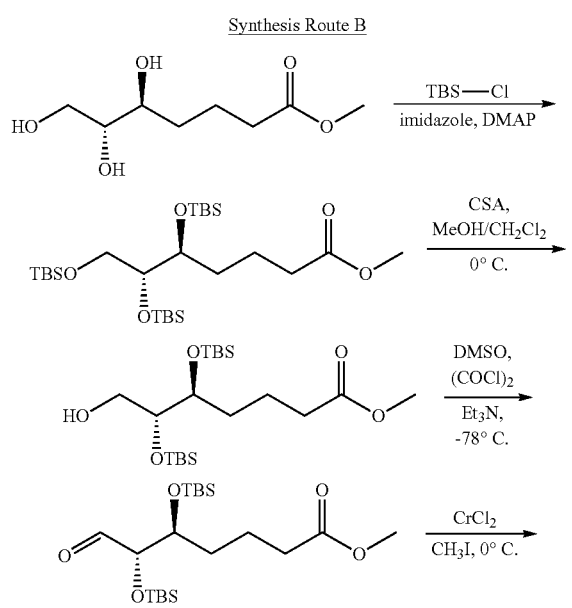
O-protected cyano alkyls used as starting materials were synthesized as shown in Synthesis Route C.
Synthesis Route C
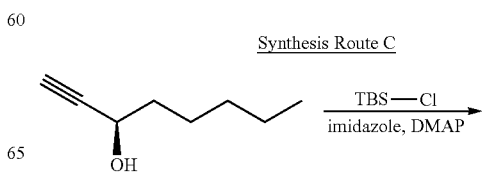

-continued

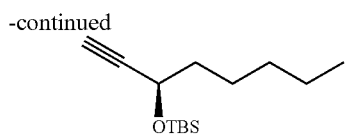

These synthesis methods may be analyzed with several known protocols. For example, proton NMR and/or mass spectroscopy (e.g., positive mode MS, etc.) may be used to determine the structure of the compounds.

Example 2: Stability Measurements

Stability measurements may be performed on compositions comprising the lipoxin analogs disclosed herein. For example, Compound Vb may be incorporated into several aqueous solutions at a variety of pHs. These compositions may be subjected to the International Council for Harmonisation of Technical Requirements for Pharmaceuticals for Human Use (ICH) measurements on stability such as Q1A-Q1F. For example, the compositions may be subjected to ICH conditions including long term conditions (−20°±4° C.) and accelerated conditions of simulated room temperature (40°±2° C./70%±5% RH). At each time interval, the composition may undergo a physical examination, identification of the components (via thin layer chromatography), identity and purity measurements (via liquid chromatography/mass spectrometry) and water content (via Karl Fischer titration). Stability measurements may be measured with a stability protocol as outlined in Table 1 to determine those compositions with increased stability over time. In Table 1, "A" indicates time points of the protocol where the stability measurements may occur following formulation. It will be understood that stability measurements may be performed at any time point listed in Table 1.

greater than 7.2) will maintain the ester form of lipoxin analogs (e.g., Compound (Vb), Compound (Xb), etc.). As shown below, compositions without basic pH result in degradation of the ester form of the lipoxin analog. In the stability testing, the pH may be set and monitored during experimental protocol, thus preventing acid induced hydrolysis of the ester forms of lipoxin analogs (e.g., Compound (Vb), Compound (Xb), etc.).

Compounds suitable for formulation and synthesized in the manners described herein should meet certain known parameters. For example, the compounds should meet the specifications as identified in Table 3.

TABLE 3

| Analysis | Specification |
| --- | --- |
| Heavy Metals analysis including Pd by microwave digestion and inductively coupled plasma mass spectrometry (ICP/MS) | >10 ppm heavy metals |
| Arsenice by ICP/MS | >1 ppm |
| Residual Solvents (USP <467>) | >100 ppm ethanol<br>>100 ppm diethyl ether<br>>100 ppm isopropyl alcohol<br>>100 ppm acetonitrile<br>>100 ppm dichloromethane<br>>100 ppm ethyl acetate<br>>100 ppm tetrahydrofuran<br>>50 ppm chloroform<br>>100 ppm 1,2-dimethoxyethane |
| Residual Solvents (gas chromatography/flame ionization detector) | >100 ppm methanol<br>?100 ppm hexane<br>>100 ppm cyclohexane<br>>100 ppm dioxane<br>>100 ppm pyridine |
| Karl Fischer Water Titration | >5% water by weight |

TABLE 1

|  | Day 0 | Day 1 | Day 3 | Day 7 | Mon 3 | Mon 6 | Mon 9 | Mon 12 | Mon 18 | Mon 24 | Mon 36 | Mon 48 | Mon 60 |
| --- | --- | --- | --- | --- | --- | --- | --- | --- | --- | --- | --- | --- | --- |
| −20° C. | A |  |  |  | A | A | A | A | A | A | A | A | A |
| 25° C./60% RH | A | A | A | A |  |  |  |  |  |  |  |  |  |
| 40° C./75% RH | A | A | A | A |  |  |  |  |  |  |  |  |  |

Several compositions comprising lipoxin analogs may be created. For example, the composition may have the components as shown in Table 2

TABLE 2

| Component | Weight % |
| --- | --- |
| Solvent (e.g., water, ethanol, propylene glycol, combinations thereof, etc.) | 70%-90% |
| Additional Ingredients (e.g., flavoring agents, sweeteners, surfactants, combinations thereof, etc.) | >20% (e.g., 0.1%-10%, etc.) |
| Buffering Agent (e.g., phosphate buffer agents) | 1%-30% |

The lipoxin mimetic may be formulated in the composition at various pH ranges. It is believed that compositions with a pH of greater than 7 (and specifically greater than 7.2) will be able to solvate and maintain stability of alkyl ester forms of compounds having the structure of Formula (V) (e.g., $R_4$ is methyl, etc.) and carboxylate salts thereof. At normal conditions, long term conditions, and accelerated aging conditions, compositions with basic pH (e.g., pH Example 3: Clinical Study of Treatment with Compound Vb A series of chemically and metabolically stable benzo-lipoxin analogs were produced as disclosed in Petasis, N., et al., Bioorg Med Chem Lett 18(4): 13821387, hereby incorporated by reference in its entirety. As described herein, these analogs featured a modification of the tetraene portion of lipoxin via substitution of a benzo-fused ring system while retaining the biological activity of the lipid chain moieties. These compounds were found to have longer half-life in vitro and ease of synthesis through iterative palladium-mediated coupling methods. In comparison with native lipoxin A4, Compound Vb and related analogs were not readily converted to inactive forms in an in vitro stability assay system containing eicosanoid oxido-reductase. This particular analog was most effective at inhibiting polymorphonuclear neutrophil infiltration in a murine peritonitis model (approximately 32% inhibition [n=5-10, p<0.005 compared with the vehicle control]). In the same model system, the benchmark compound, ATLa, gave 40% inhibition of polymorphonuclear neutrophil infiltration (p<0.05)

as disclosed in Sun, et al., Prostaglandins Leukot Essent Fatty Acids 81(5-6): 357366, hereby incorporated by reference in its entirety.

A clinical study comprised of 3 groups in a randomized, placebo-controlled, double-blind design with an additional group that received no treatment was performed to evaluate the use of Compound (Vb) on the treatment of gingivitis. Subjects were healthy adults, aged 18 through 65 years, with gingivitis as defined by Marginal Gingival Index (MGI) ≥2.0. The treatment group (Compound (Vb) oral rinse) and the placebo rinse group consisted of 50 subjects each. The no-rinse control group consisted of 27 subjects. These group sizes were planned to allow for a 20% dropout rate.

The control oral rinse was formulated as shown in Table 4, which was formulated with at pH stabilizing agent such as a buffer. The pH of this solution was 7 or less.

TABLE 4

| Component | Weight % |
|---|---|
| Saccharin sodium | 0.03 |
| Ethanol | 10 |
| Propylene glycol | 7 |
| Sodium lauryl sulfate | 0.25 |
| Sorbitol | 10 |
| Flavoring oil | 0.145 |
| Water | 72.575 |

The Compound (Vb) oral rinse group received the active agent at a concentration of 1.0 µM in the oral rinse applied once daily (after morning teeth brushing) for 28 days. Thirty-two subjects reported a total of 56 treatment emergent adverse effects (TEAEs), with the greatest percentage of subjects reporting at least 1 TEAE in the Compound (Vb) group (38.0%) followed by the placebo group (20.0%) and the no-rinse control group (11.1%). Overall, 10 subjects reported at least 1 TEAE considered related to study drug, and 5 subjects reported at least one TEAE related to study procedures. No TEAEs led to study drug discontinuation.

A total of 10 subjects (7.9% of the Safety population) reported at least 1 TEAE considered related to study drug. Study drug-related TEAEs were reported in 6 subjects in the Compound (Vb) group and 4 subjects in the placebo group.

Four subjects in the Compound (Vb) group reported oral TEAEs that were considered possibly related to study drug (3 subjects reported dry mouth and 1 subject reported an oral disorder). All oral TEAEs were mild in severity and resolved without action.

No clinically meaningful shifts in blood chemistry, hematology, urinalysis, ulceration or erythema were observed over time or among groups. In addition, no pregnancies were reported during the course of the study.

In conclusion, treatment with Compound (Vb) was generally safe and well tolerated in this study. No safety signals beyond mild oral irritation were identified.

The primary outcome of this study was safety, and therefore, all efficacy analyses were considered secondary outcomes. The key secondary efficacy outcomes in this study were Modified Gingival Index (MGI) and BOP. As shown in FIG. 1, treatment resulted in a clinically important decrease in mean MGI at Day 14 and 28 relative to placebo.

Treatment with Compound (Vb) did not result in meaningful differences between Compound (Vb) and placebo with respect to BOP at Day 28 (p=0.876 for Compound (Vb) versus placebo).

The pocket depth reduction was most pronounced in sites with pockets >6 mm, with a reduction of −1.23±0.406 mm (SD) in the Compound (Vb) group versus −0.71±0.343 mm in the placebo and −0.46±0.405 mm in the no rinse control group. The differences indicate a clinically meaningful trend.

In this study, Compound (Vb) reduced the extent of clinical gingivitis when compared with the placebo group suggesting that further studies should be conducted to characterize the dose response of Compound (Vb), and determine the dose to be used in a phase 3 study and evaluate if Compound (Vb) is superior to a placebo oral rinse in reducing pocket depth in patients with periodontitis. As this was an early phase study primarily focused on safety, a single dose predicted to be safe in humans was used.

However, over the course of the study, the formulation was found to result in an increase in the free acid form of Compound (Vb) as a result of the neutral pH of the formulation inducing hydrolysis of the methyl ester. Without wishing to be bound by theory, it is believed that increasing the pH of the oral rinse formulation increases the stability of the methyl ester forms of these benzo-lipoxin analogs and mimetics, therefore allowing for more efficient delivery of the active compounds (e.g., Compound (Vb), etc.) in these formulations.

As various changes can be made in the above-described subject matter without departing from the scope and spirit of the present invention, it is intended that all subject matter contained in the above description, or defined in the appended claims, be interpreted as descriptive and illustrative of the present invention. Many modifications and variations of the present invention are possible in light of the above teachings. Accordingly, the present description is intended to embrace all such alternatives, modifications and variances which fall within the scope of the appended claims.

The invention claimed is:

1. A method comprising:
   a) contacting a compound having the structure of Formula (I):

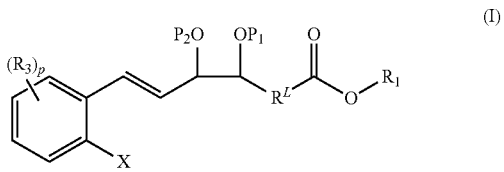

with a compound having the structure of Formula (II):

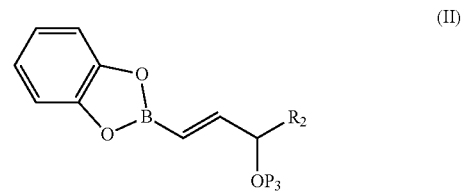

in a reaction environment having a pH greater than 7;
to form a compound having the structure of Formula (III):

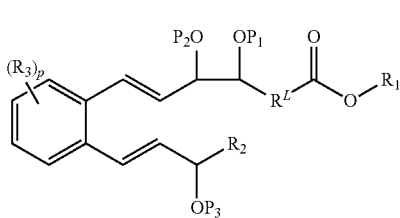
(III)

b) deprotecting said compound of Formula (III) to produce a compound having the structure of Formula (IV):

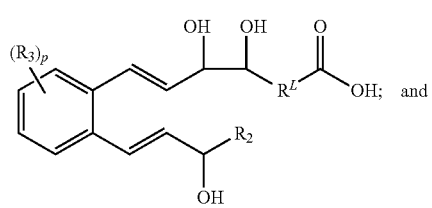
(IV)

c) reacting said compound having the structure of Formula (IV) with an alkylating agent to form a compound having the structure of Formula (V):

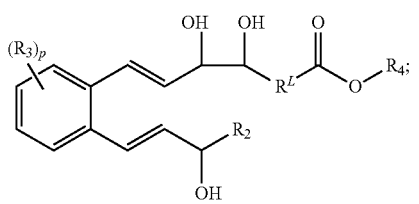
(V)

wherein p is an integer from 0-4;

$R_1$ is selected from hydrogen, saturated or unsaturated $C_1$-$C_7$ alkyl optionally substituted one or more times, and $C_1$-$C_7$ heteroalkyl optionally substituted one or more times;

$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;

$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;

$R_4$ is selected from saturated or unsaturated $C_1$-$C_7$ alkyl optionally substituted one or more times, and $C_1$-$C_7$ heteroalkyl optionally substituted one or more times;

$R^L$ is absent or a divalent $C_1$-$C_7$ hydrocarbon optionally substituted one or more times;

$P_1$-$P_3$ are each independently an oxygen protecting group; and

X is a halogen.

2. The method according to claim 1, wherein said compound of Formula (III) has the structure:

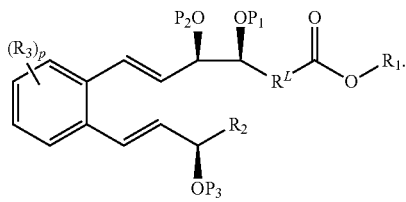

3. The method according to claim 1, wherein said environment is an aqueous environment comprising a base, a palladium catalyst, and combinations thereof.

4. The method according to claim 1, wherein $R_1$ is $C_1$-$C_7$ alkyl; and/or wherein $P_1$-$P_3$ are each silyl protecting groups.

5. The method according to claim 1, wherein $R^L$ is $C_1$-$C_7$ alkylene and/or $R_2$ is $C_1$-$C_7$ alkyl.

6. The method according to claim 1, wherein said compound of Formula (III) has the structure of Formula (IIIa):

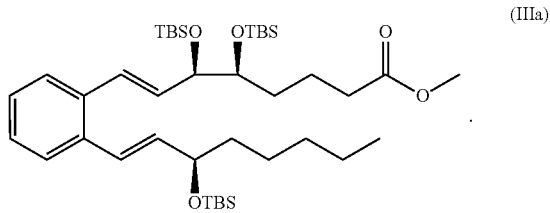 [SMILES: CCCCC[C@H](/C=C/c1ccccc1/C=C/[C@@H](O[Si](C)(C)C(C)(C)C)[C@H](CCCC(=O)OC)O[Si](C)(C)C(C)(C)C)O[Si](C)(C)C(C)(C)C]
(IIIa)

7. The method according to claim 1, wherein the deprotecting step occurs in a first environment comprising an organic solvent comprising a quaternary ammonium salt and a second aqueous environment comprising an alkali metal hydroxide;

wherein said second aqueous environment has a pH greater than 7.

8. The method according to claim 1, wherein $R_4$ is methyl, ethyl, propyl, or isopropyl.

9. A method comprising:
a) deprotecting a compound of Formula (III):

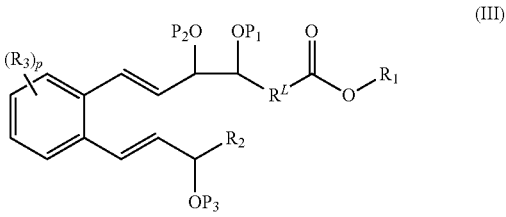
(III)

to produce a compound having the structure of Formula (IV):

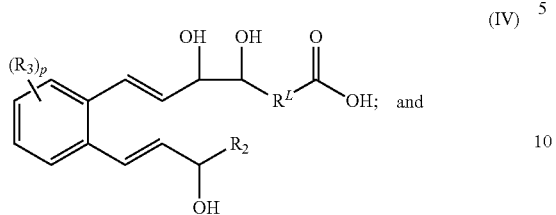

b) contacting said compound having the structure of Formula (IV) with an alkylating agent to form a compound having the structure of Formula (V):

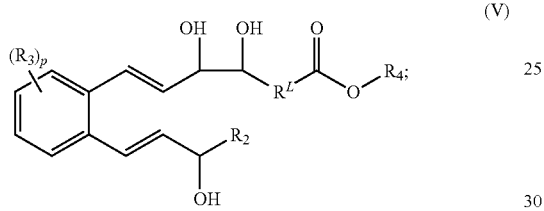

wherein p is an integer from 0-4;

$R_1$ is selected from hydrogen, saturated or unsaturated $C_1$-$C_7$ alkyl optionally substituted one or more times, and $C_1$-$C_7$ heteroalkyl optionally substituted one or more times;

$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;

$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;

wherein $R_4$ is selected from saturated or unsaturated $C_1$-$C_7$ alkyl optionally substituted one or more times, and $C_1$-$C_7$ heteroalkyl optionally substituted one or more times;

$R^L$ is absent or a divalent $C_1$-$C_7$ hydrocarbon optionally substituted one or more times;

$P_1$-$P_3$ are each independently a protecting group; and said deprotecting step occurs in a reaction environment with a pH greater than 7.

10. A method comprising:
contacting a compound having the structure of Formula (VI):

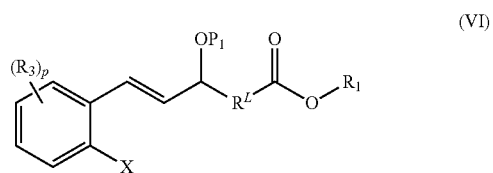

with a compound having the structure of Formula (VII):

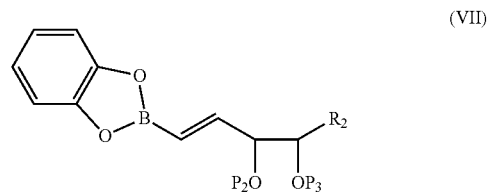

under in an environment suitable with a pH greater than 7 to form a compound having the structure of Formula (VIII):

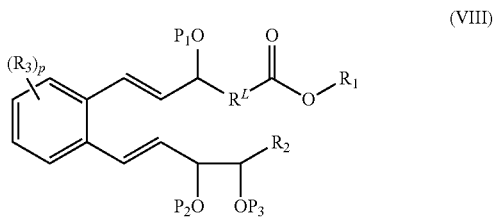

wherein p is an integer from 0-4;

$R_1$ is selected from hydrogen, saturated or unsaturated $C_1$-$C_7$ alkyl optionally substituted one or more times, and $C_1$-$C_7$ heteroalkyl optionally substituted one or more times;

$R_2$ is selected from hydrogen, halogen, hydroxy, cyano, nitro, saturated or unsaturated $C_1$-$C_7$ alkyl optionally substituted one or more times, and $C_1$-$C_7$ heteroalkyl optionally substituted one or more times;

$R_3$ is independently selected at each occurrence from hydrogen, hydroxy, halogen, cyano, nitro, saturated or unsaturated $C_1$-$C_7$ alkyl optionally substituted one or more times, saturated or unsaturated $C_1$-$C_7$ alkoxy optionally substituted one or more times, and $C_1$-$C_7$ heteroalkyl optionally substituted one or more times;

$R^L$ is absent or a divalent $C_1$-$C_7$ hydrocarbon optionally substituted one or more times;

$P_1$-$P_3$ are each independently an oxygen protecting group; and

X is a halogen.

* * * * *